United States Patent [19]

Mohan et al.

[11] Patent Number: 5,327,556
[45] Date of Patent: Jul. 5, 1994

[54] FAST INTERSYSTEM PAGE TRANSFER IN A DATA SHARING ENVIRONMENT WITH RECORD LOCKING

[75] Inventors: Chandrasekaran Mohan, San Jose; Inderpal S. Narang, Saratoga, both of Calif.

[73] Assignee: International Business Machines Corporation, Armonk, N.Y.

[21] Appl. No.: 59,734

[22] Filed: May 11, 1993

Related U.S. Application Data

[63] Continuation of Ser. No. 656,567, Feb. 15, 1991, abandoned.

[51] Int. Cl.⁵ ............................................. G06F 15/40
[52] U.S. Cl. ................................. 395/600; 364/282.1; 364/246.8; 364/244.3; 364/DIG. 1
[58] Field of Search ............... 395/600, 425, 725, 200, 395/700; 371/10.1

[56] References Cited

U.S. PATENT DOCUMENTS

| | | | |
|---|---|---|---|
| 4,128,874 | 12/1978 | Pertl et al. | 364/200 |
| 4,399,504 | 8/1983 | Obermarck | 364/200 |
| 4,604,694 | 8/1986 | Hough | 364/200 |
| 4,698,752 | 10/1987 | Goldstein et al. | 364/200 |
| 4,823,261 | 4/1989 | Bank et al. | 364/200 |
| 4,937,733 | 6/1990 | Gillett, Jr. et al. | 364/200 |
| 4,961,139 | 10/1990 | Hong et al. | 364/200 |
| 4,965,719 | 10/1990 | Shoens et al. | 364/200 |
| 5,089,985 | 2/1992 | Chang et al. | 395/600 |
| 5,202,971 | 4/1993 | Henson et al. | 395/425 |

FOREIGN PATENT DOCUMENTS

| | | |
|---|---|---|
| 0131277 | 7/1984 | European Pat. Off. ...... G06F 12/08 |
| 0328827 | 12/1988 | European Pat. Off. ....... G06F 9/46 |
| 0379769 | 7/1989 | European Pat. Off. ...... G06F 12/08 |

OTHER PUBLICATIONS

"High Availability Mechanisms of VAX DBMS Software", Rengarajan et al., Digital Technical Journal, No. 8, Feb. 1989.
"Integrated Concurrency-Coherency Controls for Multisystem Data Sharing", D. Dias, et al., IEEE Transactions, vol. 15, No. 4, Apr. 1989.
"Research Report", C. Mohan, et al., IBM Research Division, Computer Science -58 pages.
AMC Transactions on Computer Systems, vol. 4, #4, Nov. 1986, NY, pp. 273-298, Archibald, Cache Coherence Protocols.
7th International Coherence on Distributed Computing Systems Sep. 25, 1987 Berlin, pp. 154-161, E. Rahm, p. 154, line 28, p. 156, line 8 p. 156, line 35, p. 157, line 41.

Primary Examiner—Gopal C. Ray
Attorney, Agent, or Firm—Baker, Maxham, Jester & Meador

[57] ABSTRACT

A fast technique for transferring units of data between transaction systems in a shared disk environment. The owning system, having updated the page, generates a version number for the page which is stored with a lock possessed by the owning system. When a requesting system seeks a record on the page, its request for a lock illicit an indication that a more recent version of the page is required in the local memory. The buffer management component of a DBMS, with assistance from the lock management, triggers a memory to memory transfer of the page from the owning DBMS to the requesting DBMS using a low overhead communication protocol. The transfer of page is without disk I/O or the log I/O for the updates made to the page.

12 Claims, 5 Drawing Sheets

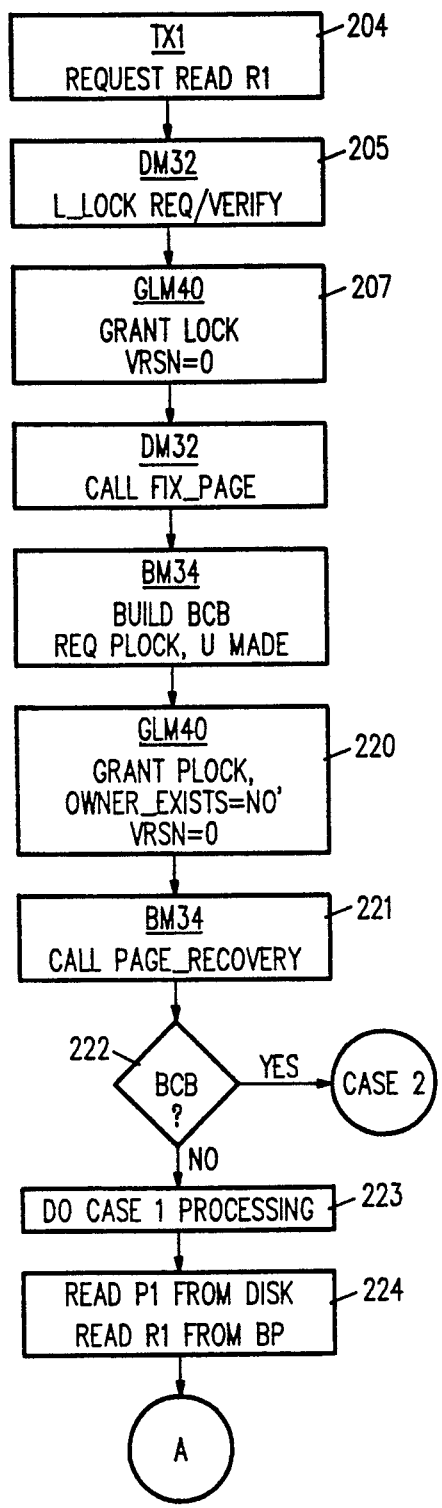
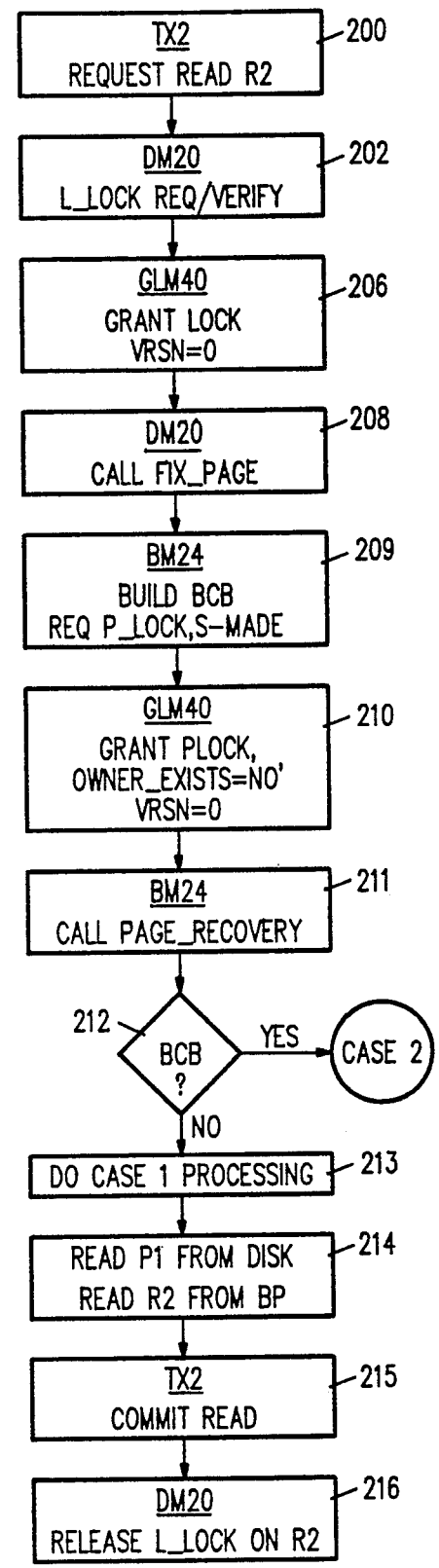
FIG. 3A'    FIG. 3A"

FAST INTERSYSTEM PAGE TRANSFER IN A DATA SHARING ENVIRONMENT WITH RECORD LOCKING

This is a file wrapper continuation of application Ser. No. 07/656,567, filed Feb. 15, 1991, now abandoned.

CROSS-REFERENCE TO RELATED APPLICATIONS

The following co-pending U.S. Patent Applications are commonly assigned with and contain material which is relevant to the material in this application:

U.S. patent application Ser. No. 07/715,505, filed Jun. 14, 1991, for "METHOD FOR NON-HIERARCHICAL LOCK MANAGEMENT IN A MULTI-SYSTEM SHARED DATA ENVIRONMENT"; and U.S. patent application Ser. No. 07/059,666, filed Jun. 8, 1987, for "METHOD FOR MANAGING SUBPAGE CONCURRENCY CONTROL IN PARTIAL TRANSACTION ROLLBACK IN A TRANSACTION-ORIENTED SYSTEM OF WRITE-AHEAD LOGGING TYPE".

BACKGROUND OF THE INVENTION

This invention relates to the control of access to, and maintenance of, the integrity of data resources in a data sharing environment in which multiple instances of a database management system have access to one or more permanent data storage resources. Attendant with the provision of common access is the need to make the access fast while maintaining integrity of accessed data.

A suggested approach to improving capacity and availability in a single-system database management system (DBMS) is the use of multiple systems. A principal architecture in use in the multi-system environment is called "data sharing" and involves the sharing of access to non-volatile data storage resources such as disks. The architecture is also referred to as the "shared disks" (SD) environment. In the SD environment, all disks containing the database are shared among the different CECs. Every CEC that has an instance of the DBMS executing on it may access and modify any portion of the database on the shared disks. In this architecture, a global locking facility is required for concurrency control of data units by different DBMS instances. In this architecture, each CEC maintains its own buffer for temporary data storage. In order to maintain coherency of data units which have been buffered, a global locking facility and protocol may be provided. A representative shared disks architecture is the IMS/VS Data Sharing product available from the assignee of this application.

Typically, in the shared disks environment, data units are obtained and transferred in the form of "pages". Initially, an executing transaction requests data (usually, a "record") from the DBMS in its CEC. The DBMS obtains the page containing the record, places it in its buffer, and notifies the transaction of the availability and location of the page.

The page may be obtained by the DBMS either from a disk (in the form of a direct access storage device, DASD), or from another instance of the DBMS which has previously buffered the page.

Whether a record can be immediately obtained depends upon whether the record is currently being accessed by another transaction. For example, if the record has been obtained by another transaction for the purpose of changing data in it, any subsequent requests for access must be synchronized with the updating process in order to ensure that the most current version of the data is available. Synchronization of access to a piece of data is effected by granting a "lock" to a transaction currently updating that data, which prevents all other transactions from gaining access to that data.

In fact, a lock may not necessarily bar access to a page. If the lock is a shared (S) lock, more than one transaction may have access to the page. If the lock is exclusive (X), only the transaction possessing the lock may have access to the page.

Shared locks permit multiple, concurrent access to a page, and an S lock will be granted in the face of another S lock on the same page. If an X lock is requested on a page which is S-locked, the requesting transaction is suspended until the S lock is surrendered.

In transaction processing, when a transaction possesses a lock on a unit of data for the purpose of updating the unit, the lock is not surrendered until the update is either "committed" or "rolled back". In this regard, when the transaction attempts to update a page, the updates will be committed when the transaction reaches a particular stage (the "synch point"), or all the attempted updates will be undone. The purpose of this procedure is to maintain consistency of the page when a system abnormality occurs during an update process which may affect the integrity of the process. If the update process is completed with no indication of terminating conditions, the update is "committed"; if abnormal conditions are indicated, the update is "rolled back".

When a transaction has completed an update process and the updates are committed, the transaction may release its lock on the updated unit of data, signaling to other requestors that the unit is available, and guaranteeing the integrity of the data in the unit.

The reversibility of an update process is supported by a "log" which a DBMS maintains in a reliable storage resource such as a disk. The log is a chronological, or time-based, history of transaction updating activity which identifies the transaction, the unit of data being updated, the condition of the unit before updating, the condition of the unit after updating, and the time of the updating process. The roll back operation (also called "recovery") uses log entries to restore a unit of data to its form before a failed update operation began.

The subjects of transaction integrity, recovery, concurrency, and locking are covered in detail in Chapter 18 of C. J. Date's book entitled "AN INTRODUCTION TO DATABASE SYSTEMS", Addison-Wesley, 1986.

Locking and transaction processing are designed to meet the problems of multiple access, coherency, and recovery in a database system. A need exists to extend these techniques in a multi-system, data sharing environment so that fast access is afforded to units of data when requested without sacrificing the integrity of the data. Data integrity could be threatened when, for example, one instance of a DBMS in one CEC is updating a page to which another instance of the DBMS in another CEC is requesting access. With a proliferation of DBMS instances in different CECs, the challenge is to provide the fastest access to units of data which may be either buffered or stored on disk, while maintaining the integrity of those units of data.

SUMMARY OF THE INVENTION

It is, therefore, an object of the invention to provide an improved method and structure for providing fast access to data resources by multiple users on multiple instances of a DBMS while ensuring coherency of the data resources.

A further object of this invention is to provide a locking procedure which supports inter-DBMS transfer of units of data without storage to disk.

A still further object of this invention is to avoid disk I/O in a multiple user, data-sharing environment by transferring a modified unit of data from the buffer of one DBMS to another DBMS which needs it.

It is a further object of this invention to permit updates to a unit of data to be made by several systems before the unit is written back to disk.

According to the invention, a multiple user, data-sharing arrangement permits a plurality of instances of a DBMS which may be executing on one or more central electronic complexes to gain access to data stored in one or more disks available to all instances of the DBMS. In this arrangement, lock management is provided by a global locking system which manages locks on units of data and data records for all instances of the DBMS. Fast access to units of data requested by transactions executing on different DBMS instances is provided by inter-DBMS transfer of requested data units without disk I/O and with the guarantee of the integrity of the transferred data unit by the method of:

maintaining a global lock table at a global lock manager, the global lock table including one or more entries, each entry corresponding to a lock granted to a DBMS;

issuing a P lock for updating a data unit to a first DBMS;

entering an entry for the P lock in the global lock table;

providing the data unit from a disk to a buffer of the first DBMS;

generating an updated data unit in the buffer by updating the data unit at the first DBMS;

in response to updating the data unit:

generating a version number for the updated data unit at the first DBMS, the version number being a monotonically increasing number;

attaching the version number to the updated data unit in the buffer of the first DBMS; and storing the version number in the entry for the P lock in the global lock table;

issuing a request for an L lock to read a record on the data unit from a second DBMS;

in response to a request for the L lock, providing the second DBMS with the version number stored in the global lock table and granting the L lock;

if a version of the data unit is in a buffer of the second DBMS, comparing the version number in the data unit with the version number from the global lock table and requesting the data unit in the global lock manager if the version number in the data unit is less than the version number from the global lock table; otherwise, if the data unit is not in a buffer of the second DBMS, issuing a request from the second DBMS to the global lock manager for a P lock to read the data unit;

providing a request from the global lock manager to the first DBMS to transfer the data unit to the second DBMS in response to the P lock request or the request for the data unit;

forwarding the updated data unit from the first DBMS to the second DBMS and providing the version number of the updated data unit from the first DBMS to the global lock manager;

forwarding the version number received from the first DBMS by the global lock manager to the second DBMS;

if the version number provided to the second DBMS is greater than the version number in the updated data unit received by the second DBMS or if the updated data unit has not been received at the second DBMS when the version number arrives, writing the updated data unit to a disk from the first DBMS, providing the data unit to the second DBMS from the disk and reading the record; otherwise, reading the record from the updated data unit transferred to the second DBMS from the first DBMS.

In the event that the second DBMS wants to update the record, the global lock manager forwards a request to the first DBMS to transfer the data unit. The first DBMS transfers the data unit to the second DBMS, while providing the version number for the updated data unit to the global lock manager and writing the updated data unit to a disk. The first DBMS then releases its P lock and the global lock manager provides the version number to the DBMS. If the second DBMS has received the updated data unit by the time it receives the version number, it accepts the updated data unit if the version number matches the version number in the updated data unit. Otherwise, the updated data unit is provided to the second DBMS from the disk. The second DBMS then updates the record in the updated data unit.

DISCLOSURE OF THE INVENTION

Figure 1:
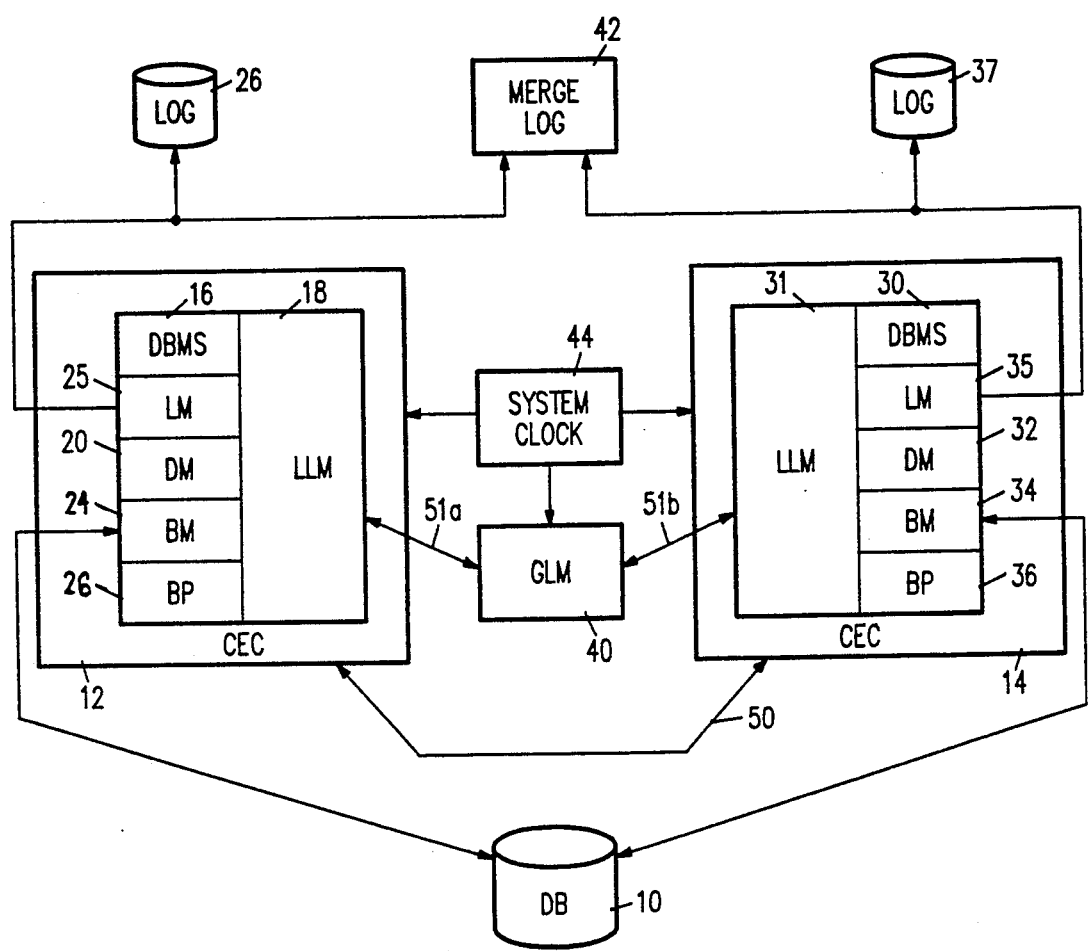
FIG. 1 is a block diagrammatic representation of a typical computing system environment for operation of the invention.

In the IBM DB2 database system, updated pages are not written to disk at transaction commit time in order to improve the transaction response time and concurrency. An updated page which has been obtained from disk and updated by a process is called a "dirty" page. Retention of a dirty page in the buffer of an updating system is called "caching" a dirty page. In order to guarantee proper completion of recovery in the event of a DBMS failure, enough information is recorded in the updating system's log at checkpoint to redo updates contained in the dirty page. In a data sharing environment, each DBMS instance has its own buffer pool to cache pages and also has a local log. If a dirty page is cached in one system (referred to as the "owner"), then another system requesting the page must get the current version of the page from the owner. The owner could transfer the page to the requestor by a) a memory-to-memory transfer between database systems (hereinafter, "a page transfer"), or b) writing the page to disk and then making the requestor read it from the disk. Manifestly, the response time and concurrency advantages lie with memory-to-memory transfer since it is possible to save two disk I/O processes (a write I/O by the owner and a read I/O by the requestor).

Coherency can be assured in memory-to-memory transfer by a message process in which the owner writes the updated page to disk, then broadcasts a message invalidating all other buffered versions of the page, and waits for acknowledgements from all possible requestors before releasing the lock on the page. A buffer invalidation broadcast, however, can be wasteful in cases where there is a low incidence of contention for pages. This process also increases the transaction response time and reduces concurrency.

The invention provides propagation of an updated page from an owner to a requestor on demand of the requestor. In this respect, the invention provides for the detection of a cached dirty page by a requesting process and speedy provision of the updated page to the requestor by the owner.

Detection of a cached dirty page is provided in the invention by a trail kept at a global lock manager in the form of a version number associated with the page. The trail is easily used to detect an out-of-date copy of the page. The trail is made without additional messages.

The trail is especially adapted for a multi-user, data sharing environment in which a global table of granted locks is maintained for all users. In this respect, when a lock for the purpose of updating a page is first requested on a page which is not currently buffered, the lock is granted, the page is obtained from the disk, the page is updated, a version number is generated for the page, and the version number is stored in the lock record entered in the global lock table for the page.

Now, any following request for a lock on the data unit will receive a response including the updated version number. The requestor can compare the version number received in the response with the version number attached to its copy of the data unit to determine whether it needs a new version. If the requestor's version number is less than the returned version number, the requestor can seek transfer of the latest version from the owner, or obtain it from DASD.

FIG. 1 illustrates a multi-user data sharing environment in which the invention is practiced. In the multi-user, data sharing environment, a database (DB) 10 may include one or more direct access storage devices (disks) for permanent (non-volatile) storage of data. Data is stored to, and obtained from, the DB 10 by a plurality of central electronics complexes, two of which are indicated by 12 and 14. Each of the CECs serves one or more database users and includes for this purpose suitable database management functions. For example, the CEC 12 includes a database management system (DBMS) 16 having a data manager (DM) 20, a buffer manager (BM) 24, and a buffer pool (BP) 26. The DBMS 16 maintains a log 27. Similarly, the CEC 14 includes DBMS 30 with DM 32, BM 34, BP 36, and a log 37. In this description, the different DBMSs are identical, and are also referred to as "instances" of each other.

Access to units of data stored in the DB 10 is managed by a locking system including local locking managers (LLMs) 18 and 31 and a global locking manager (GLM) 40.

Locking is managed by the GLM 40 in conjunction with the LLMs. Relatedly, a transaction will request access to an identified unit of data. This request is passed by a message through the DBMS where the transaction is executing. Implicit in the request is a request for a lock, which the DBMS 16 passes to its local lock manager. The LLM forwards the lock request to the GLM. The GLM receives and processes grant requests from its LLMs and processes the requests, granting locks by means of messages returned to the requesting LLMs.

The lock management arrangement of FIG. 1 provides global locking functions, but does not perform I/O on the DB 10 when the locks are granted. Inherent in the global locking management function is the ability of the lock manager (comprising, for a DBMS, its LLM in conjunction with the GLM) to determine and identify any other DBMS having an updated version of a unit of data for which a lock is requested. Further, given a message and a lock name, the lock manager can send the message to the current holder or holders of that lock. This is termed a "notify" message.

The DBMS instances 16 and 30 can comprise currently available systems which operate in conjunction with a global locking function. It is assumed that these instances communicate with a lock manager by means of messages. An implementation of the invention enhances the DBMSs to provide a new and useful method for detecting dirty pages and effecting the memory-to-memory transfer of detected dirty pages without the need for conducting I/O operations with the DB 10.

For performance reasons, each DBMS instance has its own log manager which maintains its own log to which log records are first written. In DBMS 16, the log manager (LM) 25 manages the log 27. In DBMS 30 LM 35 manages log 37. For the purpose of handling data recovery, a merge log function produces a merged version of the local logs (the "merged log" 42 in FIG. 1). This function can exist in any CEC in the complex. A log manager associates with each log record a log sequence number (LSN) which is a monotonically increasing value. For example, an LSN can comprise a timestamp, requiring that the clocks in the multi-user data sharing complex of FIG. 1 be synchronized by a system clock 44.

In the discussion which follows, it is assumed that recovery is based upon write-ahead logging (WAL) in which an updated page is written back to the same DASD location from which it was read. The WAL protocol asserts that the log records representing changes to a page must already be in non-volatile storage before the changed page is allowed to replace the previous version of that page on DASD. In the invention, every page in the database has a page_LSN field which contains the LSN of the log record that describes the latest update to that page. The value in this field is also referred to as the "version number" (VRSN) of the page. This allows the page state to be related precisely with respect to the log records that have been written for it in order for recovery to be performed correctly. Further, as will be explained below, the BM in each DBMS instance uses the version number information to ensure that its log has been forced up to the corresponding LSN before it writes the updated page to DASD.

When any DBMS acquires a page for updating, it is asserted that the same page will not be updated concurrently in a different DBMS, since that would require the existence of a mechanism to merge concurrent updates into a single version of the page. Further, concurrent updating would affect the granularity of locking. To avoid these problems, the invention employs a physical (P) lock on a page to serialize the updating of that page by multiple systems and employs a logical (L) lock on a record. Logical locks are held for the duration of a transaction, while physical locks need to be held only as long as the system is holding a page in its buffer pool. P locks are acquired by a buffer manager (BM) on behalf of the transaction system, while L locks are acquired by the data manager (DM) on behalf of individual transactions. It is asserted that a locking compatibility relationship amongst the different modes of locking exists and that locking modes include S and X, explained above, and U for "update". The update mode permits other systems to acquire S mode locks, but bars all other locks until the updating transaction is completed.

In the invention, P locks will be conditioned to either the S or U mode, while L locks will be conditioned to the S or X mode.

The different elements of FIG. 1 are directly connected to one another by way of high speed communication links over which the systems communicate by a conventional message-passing protocol. In this regard, the CEC 12 communicates with global lock manager 40 over high-speed link 51a, while link 51b connects the GLM 40 with the CEC 14. Direct connection between the CECs 12 and 14 is provided by high speed link (comm-link) 50. Direct shipping of a page between the CECs 12 and 14 is by way of the link 50. Preferably, this is done by employing a datagram protocol which provides no delivery guarantees. This is important to assure that the cost of shipping a page directly is minimal.

Figure 2:
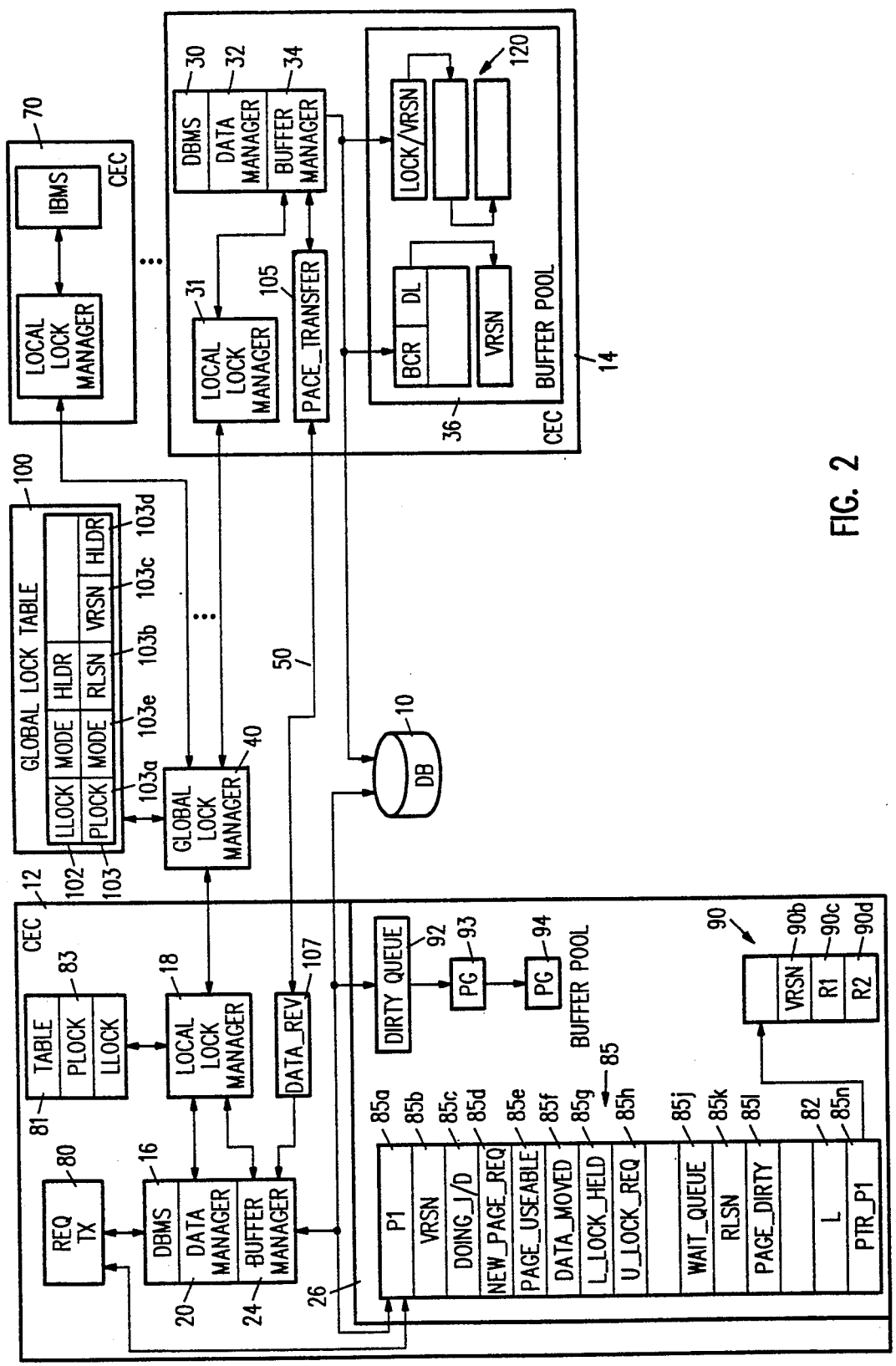
FIG. 2 is a block diagrammatic representation showing, in greater detail, functional elements and data structures necessary for practice of the invention.

Refer now to FIG. 2 for an understanding of the interconnections between the functional elements operating in the environment of FIG. 1 and data objects which are used in the practice of the invention. In FIG. 2, the CEC 12 is illustrated with a substantial amount of detail and with the understanding that the explanation applies equally to the CEC 14 which is shown with a minimum complement of functions. As FIG. 2 shows, the GLM 40 is an N-way manager which performs lock management functions for a plurality of LLMs including those in the CECS 12, 14, and 70. In each CEC, executing transactions access data by way of the local instance of the DBMS. For example, in the CEC 12 a requesting transaction (TX) 80 obtains access to data in the database in a conventional manner through the DBMS 16. Relatedly, when the TX 80 requires access to a record for reading or updating, it passes a request to the DBMS 16 where the data manager 20 passes a request for an L lock to the local lock manager 18. The requested record is retrieved by the buffer manager 24 from the buffer pool 26, either from a page already resident in the pool, or from a page transferred into the pool from another DBMS or from the DB 10. Each page in the buffer pool 26 has a buffer control block BCB, one of which is indicated by reference numeral 85.

The BCB 85 includes a plurality of information fields 85a–85n. The field 85a names the page. The field 85b (VRSN) holds the version number of the page controlled by the block. The field 85c (DOING_I/O) indicates whether the page is being obtained by an I/O process from the DB 10. The field 85d (NEW_13 PAGE_REQ) indicates whether or not a new version of the page must be brought into the buffer pool 24. The field 85e (PAGE_USABLE) indicates whether the current version of the page is usable. The field 85f (DATA_MOVED) is set when the page is moved into the buffer pool after it is received from another DBMS. The field 85g (U_LOCK_HELD) indicates whether a U-mode P lock is held on the page, while the field 85h (U_LOCK_REQ) indicates whether a U-mode P lock has been requested for the page. The field 85j (WAIT_QUEUE) indicates whether transactions served by the DBMS are queued to wait for access to the page. The field 85k stores a recovery log sequence number (RLSN) which is the earliest log point where scanning must commence to recover the page. The field 85l (PAGE_DIRTY) signifies whether the page has been updated since it was read from disk. The field 85n is a pointer (PTR) to the page. In this case, the page denoted as page P1 is indicated in the buffer pool 24 by the reference numeral 90.

The format of a page in the practice of the invention includes at least a field 90b for containing a value (VRSN) for the version of the page represented by the copy in the buffer pool, and at least one record field. In FIG. 2, the page 90 has two record fields, 90c and 90d, holding, respectively, records R1 and R2.

The buffer manager also maintains a queue of pages which have been updated, called the "dirty" queue 92 on which are queued updated pages 93 and 94.

A latch with two modes for each page is managed by the BM 24 for an executing transaction. When set, this latch indicates, respectively, that an X or S mode latch has been acquired on page P1. For page P1, a latch field (L) 82 is provided in the BCB to indicate the condition of the latch.

The local lock manager 18 manages a lock table 81 where, for each cached page, a record is maintained indicating the existence and mode of a P and one or more L locks. The format is indicated by reference numeral 83.

The global lock manager 40 maintains a global lock table 100 containing entries for locks which have been granted to local DBMS instances. An entry for P lock in the global lock table is indicated by reference numeral 103 and includes, at a minimum, fields 103a–103e. The field 103a identifies a locked page. The field 103b contains a value RLSN for the page and field 103c contains the VRSN number for the page. A holder of the lock is identified by the field 103d (HLDR), and the locking mode of the holder is indicated by the field 103e (MODE). An entry for L lock is shown by reference numeral 102 and includes, at a minimum, fields lock name, mode and holder.

To support datagram transfer on the link 50, each DBMS includes a process 105 (PAGE_TRANSFER) to assemble and send a datagram transferring a page. Each DBMS also includes a data reception (DATA_RCV) process for receiving and caching the transmitted page. In FIG. 2 and the discussion which follows, it is assumed that the CEC 12 will be requesting for read a page owned by the CEC 14, who will transfer it to the CEC 12. Thus, only the PAGE TRANSFER process 105 and DATA_RCV process 107 are shown in FIG. 2.

Turning now to the mechanics of the invention, explanation will also be given how the VRSN field of a page can provide a trail to lead a requestor to a dirty version of a page in an owner's buffer. Explanation shall also illustrate how, once discovered, the page may be transferred to the requestor. Concurrently, recovery of transferred pages will be discussed and illustrated.

PAGE TRANSFER PROCEDURES

Assume that a requesting transaction 80 in the CEC 12 requests access to a record in a page. The DM 20 receives the request and formulates an L lock request for the record. Once the L lock is obtained, DM 20 invokes fix—page procedure of BM 24. Assume that the page with the requested record is not the buffer pool 26. In this case, the BM 24 on noticing that the page is no the buffer pool, will issue a P lock request for the page. This P lock request triggers the lock management to invoke a page—transfer procedure in the system owning the page. If the page is buffered and a more recent version is needed, a notify message to the BM in the owning system will cause transfer of the page. The BM in the owning system converts its P lock, if required, so that the P lock of the requesting BM is granted. As explained below, the fix—page processing proceeds according to the particular scheme employed to transfer the page.

The record lock requested for the transaction is an L lock, while the page lock requested by the BM is a P lock. To read the record on a page, the transaction acquires an S mode L lock on the record, while its BM acquires an S mode P lock on the page before entering it into the buffer pool 26. The P lock is held as long as the page remains cached in the buffer pool. To update a record, the transaction requests an X-mode L lock on the record. However, before the transaction can update a clean page, the BM must obtain a U-mode P lock on the page. The U-mode P lock must be held by the BM for so long as the page remains dirty and cached by this buffer manager.

When the BM of the DBMS owning a dirty page acquires its U-mode P lock to update the page, it declares to its LLM that its page—transfer procedure may be invoked if (1) there is an intersystem lock conflict caused by another system seeking to update the page or (2) a requestor in another system makes a non-conflicting lock request for the purpose of reading the page. In either case, the page—transfer procedure of the owning BM will make the page available to the requestor.

When the owner of the dirty page completes the update of the page, its commit procedure engenders an unlock request for the record which includes a new VRSN value for the updated page. This value is replaced in the corresponding field in the page's lock record in the global lock table.

Now, when the requestor DM sends its lock request for the record lock with verification of version number for the page, the lock management mechanism responds by granting the record lock and the VRSN value of the page. DM passes the VRSN value received to BM on the fix—page call. In the fix—page processing, the BM checks its buffer pool to determine whether it has a version of the page and, if so, compares the VRSN value received from the lock mechanism with the VRSN value in its version of the page. Assuming it has a version of the page, and that its VRSN number is greater than or equal to the received VRSN number, the requestor BM will not acquire the dirty page from the owner. If, however, the received VRSN value is greater than the VRSN value for the page version possessed by the requestor BM, the page—transfer process of the owning BM is invoked via a notify message and the page is transferred to the requestor's BP.

Assuming a lock request and invocation of a page—transfer process to transfer a dirty page from the buffer of an owner to the buffer of the requestor, the inventors recognize one existing procedure and have designed three further procedures for effecting the transfer.

SIMPLE PAGE TRANSFER PROCEDURE

In the simple page transfer procedure, the owning BM writes the page to disk. After the write is complete, the owning BM may convert its P lock depending upon the mode of the requested lock. Then the lock mechanism grants the lock to the requestor and the BM in the requesting system reads the page from disk.

This scheme is not preferred by the inventors, but is offered to illustrate a simple transfer scheme which can be employed when conditions permit. This scheme is not preferred because it requires a lock message from the lock management to the owner BM and a DASD I/O by the owner to write the page to disk. Assuming that the WAL protocol is observed, the write I/O will force log processing. Also required is a message from the owner to the lock management for response to the page transfer and a disk I/O by the requesting BM to read the page from disk.

As should be obvious, this simple scheme is costly because it increases transaction response time and decreases concurrency.

MEDIUM SPEED PAGE TRANSFER SCHEME

In the medium speed page transfer scheme, the BM of the owner writes the requested page to disk and concurrently transfers the page to the requesting BM. The write to disk is done only if the request is for a U-mode lock. Following completion of the write to disk, the owning BM may downgrade its P lock, following which the lock management grants a lock to the requesting BM.

As should be evident, a read I/O by the requesting BM is avoided by transferring the page to the requesting BM. However, the datagram protocol does not guarantee that the requestor will receive the transferred page. In case of a system failure, only the failed system's log is needed to recover those dirty pages held in the failed system's buffer pool.

The lack of a guarantee of timely arrival of the transferred page at the requesting system gives rise to three possibilities. First, the page may arrive before the P lock is granted to the requestor. Second, the page may arrive long after the P lock is granted, in which case, the page may have been already cached by the requestor upon being read from the disk. Third, the page may arrive after the requestor BM obtained the P lock, read the page from the disk, allowed it to be modified, wrote to disk, and purged it from its buffer pool.

It is assumed that the first case is the normal one, that is, that the page will be transferred to the requestor buffer manager before its P lock request is granted.

For an understanding of how the second and third possibilities are handled, refer to the buffer control block (BCB) 85 illustrated in FIG. 2 which will have already built when P lock is requested. Assuming that when the P lock is granted the page is not cached in the buffer pool 26 nor received from the CEC 14, the BM 24 will request a U-mode lock on the page if not already held with COMM—LINK transfer option of NO, and then initiate a read I/O from the DB 10. The DOING—I/O flag in field 85c of the BCB will be marked to indicate that the page is being read from the DB 10. The inventors have not provided a timeout mechanism to re-request the page from the owner. Moreover, since the P lock was granted to the requestor after the owner wrote the page to the DB, the requestor will obtain the current version of the page from the DB. Subsequently, if the transferred page arrives and there is already a cache version, the transferred version is discarded.

In the third case, if the BCB is not found, the page is discarded.

FAST PAGE TRANSFER SCHEME

In the fast scheme for page transfer, the owner BM does not write the dirty page to disk during page transfer. This scheme requires only three messages, that is, a lock manager's message to the owning BM, a message to send the page, and a response message to the lock manager from the owner. No disk I/O is required. The fast scheme provides better response time and concurrency than the simple and medium schemes. However, this scheme complicates page recovery since a dirty page can be transferred from one system to another and can contain updates from more than one system. In the simple and medium scheme, a dirty page contains updates from only the owning system. Hence, with the fast scheme, a merged log of all systems is required to recover a page.

In the fast scheme, a dirty page is transferred from an owning to a requesting system without writing it to disk. If, as a result of this, the page's ownership is also transferred, the transferring BM can remove the page from its dirty queue. The page can contain committed and/or uncommitted updates from multiple systems. When a dirty page is transferred to another system for updating, ownership of the page is transferred to the receiving system. In the fast scheme, it is the receiving system's responsibility to write the page to disk. The owner is also responsible for recovering the page in case it fails before writing the page to disk. Of course, ownership may be further transferred without invoking recovery or writing the page to disk.

Since a dirty page may contain non-externalized updates (that is, updates not entered into the disk version of the page from multiple owners, the transaction system which first dirties the page records the recover-log sequence number (RSLN) in the corresponding field of the lock record maintained by the global lock manager 40. This RLSN value is the earliest log point in the merged log from where the log must be scanned to redo the changes logged for the associated page in case the current owner of the page fails before writing it to disk. Maintaining and tracking the RLSN are discussed below.

Since, during transfer of ownership of a page under the fast scheme, the former owner removes the page from its dirty queue, the log sequence number of the page's earliest unapplied (to the disk version of the page) log record is not used in computing restart recovery point checkpointed by the previous owner. For example, if there is only one dirty page in system S1 and its ownership is transferred to system S2, the next checkpoint in S1 would result in a recording of the restart recovery point to be the start of this checkpoint as opposed to the RLSN of the dirty page. However, the RLSNs of all the pages which are owned by a recovering system must be used in the calculation of the recovery point.

Since, during transfer of ownership of a page, the transferring owner removes a page from its dirty queue, there is a time period during which, if the RLSN is lost, recovery of the page will be jeopardized. For example, assume that a page is held in U mode by system S1 and system S2 requests it in U mode. System S1 ships the page to S2, removes it from its dirty queue, and downgrades its lock. Then, the next checkpoint of system S1 starts and records a restart point which is beyond the earliest unapplied log record for the dirty page which was shipped. Now assume that the complex containing system S1 fails. The RLSN is lost and the checkpoint information of S1 and S2 will not be available to indicate the position of the relevant log records of the dirty page. The inventors contemplate that this problem can be dealt with by checkpointing the global lock table 100, including the RLSNs, on a periodic basis. This is an environment-wide checkpoint of what is effectively a dirty page list. This checkpoint is used to determine the restart recovery point when an environment-wide or complex failure occurs. The checkpoint can be implemented by having one transaction system run a low priority process which periodically queries the global lock table 100 and records the IDs and RLSNs of those pages for which U locks are being held. The lowest recorded RLSN is thus used to compute the restart recovery point during an environment-wide restart.

A final consideration of the fast page transfer scheme concerns transfer of the page by way of the link 50. A short message is sent to the requestor with the lock grant announcing the presence of the dirty page in the owner's buffer. The usage of a stale version of the page is avoided in the same way as in the medium scheme. However, in the fast scheme, if a stale version of a page is cached or the page is not received by the time the lock is granted, the requestor cannot read the page from disk and use it as it is. The requestor must first obtain a U-mode lock if it has not already become the owner as a result of obtaining the P lock. Relatedly, the requesting system submits in its lock request that the page be written to disk by the previous owner. If the owner has not failed, it writes the page to the disk, from which the requestor can obtain it. If the current owner has failed, this permits the requestor to recover the page. Recovery in this case involves reading the older version of the page from the disk and applying the log records from the merged log to bring the page up to date. The log would be scanned from RLSN to the LSN when the owning system failed. An upper bound for the latter can be obtained by the new owner by noting, at the time it becomes the owner of the page, what the LSN would be if a new log record were written at that precise moment.

SUPER FAST PAGE TRANSFER SCHEME

In the super fast scheme, the owning BM is not required to force its log up to the LSN of the page before transferring it. With this scheme, the cost of a page transfer is three messages, no disk I/O, and no log force. However, in order to ensure that the WAL protocol is observed, this scheme requires the tracking of the LSN values associated with the page on a per-system basis for all systems where the page has been updated since it was obtained from disk. For each updating system, the LSN to be remembered is the LSN of the page as it was transferred by that system to some other system. The page can be written to disk only after all the updating systems have forced their respective logs up to the LSNs being tracked. This is required since it is assumed that each system has its own log which makes the log force of each system independent of those of the others.

Tracking of log records for a sequence of systems can be accomplished according to the following procedure. A certain number of slots in the BCB for the dirty page can be allocated, each slot being used to track the LSN at the last log record written by each one of the systems which updated the page. For so long as a slot is available, an updating system notes the LSN of the log record just written for the page. Otherwise, the system follows the fast scheme, described above. That is, it would force the log before transferring the page. If a dirty page's ownership is transferred without some updating systems' logs having been forced to the requisite points, then the information in the slots is passed on to the new owner along with the page.

Before writing a dirty page to disk, its current owner ensures that all systems which previously updated the page have forced their respective logs up to the LSNs noted in the corresponding slots. For efficiency, the inventors contemplate that each system would, on a periodic basis, register with the GLM 40 the highest LSN up to which that system's log has been externalized by transfer to stable storage. This highest LSN is referred to as HI_LSN. Periodically, GLM 40 would forward HI_LSNs of other systems when it send a message to a particular system. If the log is not already known to have been forced up to the required LSN in another system, the current owner sends a message to that system and requests it to do so. In the case that one of the previous systems has failed and will not respond to a log force request, there will be in the current owner's buffer pool, a dirty page which may have some updates for which there are no log records on stable storage. Therefore, the page must be recovered in a manner described below. Before undertaking the below-described page recovery, all surviving systems which have updated the page previously are required to externalize their log records to the requisite LSNs. This avoids missing a log record which has not yet externalized for an update made by another system which may be committed later on. The current owner reads the page from DASD and recovers it using the merged log. It does this by extracting and processing the relevant log records via a scan of the merged log from the RLSN of the page to the time when the page recovery is initiated, the latter point being referred to as the To_LSN.

PAGE TRANSFER SCHEMES WITH RECORD LOCKING

Lock Management Functions

Assuming record locking in the form of the L lock described above, the lock management also assists in maintaining page coherency. Referring to FIG. 2, and assuming that the CEC 12 is the requesting, and the CEC 14 is the owning system, the global lock table records include a VRSN field for each lock. This field contains, for example, the LSN of a page and is in addition to the RLSN field, the log point for page recovery. When the first lock on a page which is not cached in any DBMS is requested the VRSN field is initialized by the lock manager to zero and the value in this field is replaced in the global lock table 100 only when a VRSN provided by a system is greater than the existing value.

With an unlock request from a lock holder, the lock management accepts a list of page lock names and their associated VRSNs. Typically, at transaction commitment time or after a transaction is completely rolled back, when the transaction system issues an unlock request to release all of the locks for a transaction, it may also send a list of page lock names of updated pages and those pages' version numbers to the lock manager in a field included in the unlock request. The purpose of passing this list with the unlock request is to register the version numbers of the updated pages so that other systems that may have cached those pages may easily verify the currency of their pages.

A list of page lock names and their current version numbers is maintained by the owner system. Such a list is indicated by a reference numeral 120 in FIG. 2 the indicated list being under control of the buffer manager 34. The list 120 is maintained by the buffer manager 34 as page updates are performed; alternatively, it can be generated at transaction termination time by scanning the buffer pool for the dirty pages. The buffer manager 34 maintains the list on a system-wide basis. When the buffer manager steals a page, it passes the VRSN of the page with its unlock request for P lock. When the lock management receives the unlock request, it enters the value in VRSN field for the lock.

It is observed that a transaction may pass the VRSN for a page which it has not updated, since the system-wide list may contain the page_ID of a page updated by another uncommitted transaction. Also, a transaction may not pass the VRSN of a page which was updated by it since this number may have already been passed by another transaction or by the buffer manager. The lock management mechanism updates the supplied VRSNs before processing the unlock request in which they were received.

For the following discussion, it is asserted that lock requests can be generated on behalf of either a transaction or a buffer manager. When the former is the requestor, the requested locks are L locks, when the latter is the requestor they are P locks. Lock requests are sent in the form of multi-field messages via the local lock manager to the global lock manager. A requestor is notified of the grant of a request in the form of a message forwarded from the GLM 40 through the LLM to the requesting transaction or the buffer manager. In the discussion which follows, short_messages are always passed as the grant messages.

Similarly, after transaction commit or roll-back, unlock requests are sent by the system owning a lock via its local lock manager to the GLM 40.

The lock management mechanism provides a verify option in conjunction with a lock request. The verify option returns the VRSN of the named page in response to a lock request. Significantly, when a DM issues a request for an L lock on a record it gets the VRSN value for the page on which the record is stored. If no lock on the page is currently held by any system, the lock management returns a VRSN value of 0 and owner_exists=NO in the short_message. The verify option is used by the DM to ensure that it is reading or will read the correct version of the page in case an older version of the page is already cached in the BM's buffer pool. The VRSN value is looked up by the lock manager after the record lock is granted and is provided with a lock-granted message. It is of importance that, at the time a request is issued for an L lock, another system might still be modifying that record, in which case the VRSN number of the corresponding page is needed after the modification of the other system is committed. By delaying looking up the VRSN value until the L lock is grantable to the requesting system, the lock management can guarantee that it will know the VRSN value of the latest committed version of the page for the updated record. The guarantee is possible because a transaction L lock will not be released until it is ensured that the current VRSN value of the page is entered in the global lock table 100. In order to accomplish this, the VRSN numbers are updated before the unlock request accompanying the VSRN values are processed during transaction termination.

The VRSN value provided in response to the verify option and a lock request is returned as a short_message. When the short_message is returned with a granted L lock, it is referred to as an L_short_message. The invent contemplate that a local lock manager may grant an L lock locally as in the case where transaction T1 in system S1 holds an S lock on record R1 and transaction T2 in S1 also requests an S lock on R1. In this case, the L_short_message that was given to the original lock requestor must be provided to the new requestor. Thus, the local lock managers have the capacity to pass the L_short_message given to T1 with the lock for R1 to T2 also. If lock management finds that the verify option refers to a page for which no system is currently holding a lock and for which there is no VRSN value to return, it can safely return the value of 0 and Owner_Exists=NO. This implies that the latest version of the page is in DB 10 and is the correct version to read. It is observed that this also means that the system requesting the L lock does not already have a version of the page cached in the buffer pool at the time the L lock was granted.

The L_short_message is used in fix_page processing to determine whether or not the requestor can use an already-cached version, if any, of a requested page. If a cached page is not current and the requestor needs a more recent version of the page, then its BM needs to obtain a new version of the page. The lock management mechanism provides a notify option to send a message to a system which holds a lock in a certain mode. The BM would use this option to obtain a new version of the page from the owner, if there is one. The BM would note in its BCB that a new version has been requested by an entry into the NEW_PAGE_REQ field (85d in FIG. 2), so that a subsequent requesting transaction which requires a more recent version than the cached version of the page will be suspended until the new version arrives. Transactions whose VRSN in L_short_message is less than or equal to VRSN of the cached page can continue to use the cached version of the page. If lock management indicates that there is no owner in existence for the page, the inference is that the disk version of the page is the latest one. In that case, the BM would read the page from the DB 10.

To understand the page_transfer procedure, refer to FIG. 2 where the owner DBMS 30 in the CEC 14 sends to the requesting DBMS 16 in CEC 12 a short_message. This message is sent by way of 31, 40, 18. This message, which contains the VRSN value of the transferred page is referred to as a P_short_message, since it relates to a P lock. The owner attaches this message to a P lock-related downgrading request if it does such an operation as part of the page_transfer operation. Otherwise, the owner passes just the P_short_message by way of LLM/GLM/LLM to the requestor after transmitting the page directly to the requestor. In this case the P_short_message acknowledges a request for the page transfer. If the owner is surrendering ownership during this operation, then the lock management updates the VRSN value of the page in the global lock table. The short_message includes a flag field owner_exists which indicates whether or not an owner exists for the page. This flag is set by the GLM 40. If there is no owner for a page for which a P lock or newer version has been requested, then the GLM 40 creates the P_short_message and includes the VRSN value that it has for the page. When there is no owner, the global lock table 100 will already have an entry for this page if at least one system is already holding an S lock on the page. In this case, the VRSN value could be non-zero as a result of the page having been updated and then the U lock having been surrendered by the updating system after the updater caused the GLM 40 to update the VRSN value in the global lock table 100. Otherwise, the VRSN number will be zero due to the fact that the global lock table entry would have been created as a result of the current lock request. In this case, as mentioned before, the VRSN field will be initialized with the value of zero.

The procedures executed by the multi-user, data-sharing environment illustrated in FIGS. 1 and 2 in practicing the method of the invention will next be described in connection with the pseudocode representation of Table I and III. As will be apparent to those skilled in the art, the pseudocode representation, together with the accompanying description, enables those skilled in the art to generate without undue experimentation, the necessary machine-executable instructions to operate a general purpose computing system according to the invention. In the pseudocode tables, "_=" signifies "not equal" and comments are bracketed between "/*" and "*/".

FIX PAGE PROCESSING FOR MEDIUM SCHEME

Initially, a transaction in the requesting system requests some data, in response to which the DM in the requesting system issues an L lock request for the record. Lock Manager grants the L lock with L_short_message. Then DM issues a fix_page request to BM with L_short_message as parameter if the request is for reading a record. L_short_message is not passed if the request is for updating the record in the page. The rational for passing L_short_message for the read case is to ensure that BM must provide a page in the bufferpool which has VRSN greater or equal to VRSN in the L_short_message. To update a record in the page, BM has to get the latest version of the page, so L_short_message need not be passed in that case. During the fix_page processing by the BM, if the page is not already cached, the BM requests a P lock on the page. In this case, the page is either owned, or not by another system.

If the page is owned by another system, the lock management would invoke the page_transfer procedure in the owning system. The owner transfers the page and sends a P_short_message which has the VRSN value of the transferred page and the Owner_Exists=YES. If the page with the VRSN has not arrived by the time the P lock is granted to the requestor, the BM will try to become owner of the page by requesting a U lock with the associated message of COMM_LINK_TRANSFER=NO. This makes the current owner write the page to disk irrespective of page_transfer scheme in use. If the current owner has failed, then the page is recovered using the RSLN provided by the GLM 40. In this case, the recovery actions to be performed depend upon the page-transfer scheme in use.

In the case where there is no owner then the P_short_message would indicate so and the requestor would read the page from the disk.

Referring now to Table I, the inputs to the fix_page processing are page_ID, request_type (read or update) and, possibly, L_short_message. The S and X latches are used during page accesses to provide physical consistency of the page's contents. The S latch 83 is used during reading access to its associated page and the X latch 82 during an update operation on the page. The BM always returns to the requesting transaction with the appropriate latch. The BM will always try to locate the BCB for the identified page. Consider two primary cases: (1) the BCB for the page does not already exist and (2) the BCB does exist.

In case 1, the BCB does not exist, implying that the page is not cached. In this case, the BM 24 allocates a buffer, builds the BCB 85 and marks the BCB field 85e to indicate that the page is unusable, sets the field 85f to off and requests a P lock on the page. The PAGE_UNUSABLE mark lets subsequent fix_page issuers know that no usable version of this page exists. The DATA_MOVE flag indicates at a later point in the processing whether the DATA_RCV process has received a copy of the page and cached it. A P lock is requested by the BM 24 in S or U mode, depending upon the request. The requested lock mode is indicated in the BCB by setting the U_LOCK_HELD field to no and the U_LOCK_REQ field appropriately to no or yes. When the requested P lock is granted, the BM receives a P_short_message with it. If an owner of the page exists, this message would have been generated by the owner, otherwise by the GLM 40. In order to serialize with the DATA_RCV process, the BM 24 S- or X-latches the page depending upon the request. If the U lock was obtained, fields 85g and 85h are updated. If the BCB is marked with the DATA_MOVED field set on and the VRSN value P_short_message is less than or equal to the VRSN value on the cached page, then the BM 24 turns the PAGE_USABLE field 85e on and awakens any transactions that might have entered the wait state pending arrival of the page. If (1) the page was not transferred (OWNER_EXISTS=no), (2) it was not received (OWNER_EXISTS=yes) and DATA_MOVED=OFF, or (3) an older version of the page was received when DATA_MOVED=ON and VRSN is less than the VRSN value in the P_short_message then the BCB is marked PAGE_UNUSABLE, DOING_I/O to indicate that an attempt is in progress to obtain a page from DASD. The marking prevents the DATA_RCV procedure from modifying the page while the I/O is in progress. In this case, the BM 24 invokes the page_recovery routine, passing to it the MUST_RECOVER flag. This flag is set to yes if owner_exists=yes; otherwise, it is set to no. On return from the page_recover routine, the BM 24 will S- or X-latch the page, depending upon the type of request and return to its caller.

The PAGE_RECOVERY routine for case 1 keys on the MUST_RECOVER flag in the BCB. If the flag is conditioned to "yes" and the BCB indicates that a U-mode lock is not held, then the recovery routine requests the P lock in U mode with the message COMM_LINK_TRANSFER=NO. The request for the U mode lock would make the owner write the page to disk. Ordinarily, the owner would not write the page to disk when an S-mode lock is requested on the page. Hence, the need to request a U-mode lock. Once the lock is granted, the BCB is updated to note that the U-mode lock is held. If the U-mode lock is already held, the MUST_RECOVER flag is set to "no", then the above processing is not done. In any case, next an I/O is initiated to read the page from disk. Once the I/O completes, the PAGE_USABLE field is set to yes in the BCB the DOING_I/O field is set to no, and the NEW_PAGE_REQUESTED flag is set to no; now, any existing waiting transactions are resumed and the call returns.

In case 2, where a BCB exists for the requested page, the BM 24 inspects the BCB PAGE_UNUSABLE field. If this field indicates that the page is unusable, then the implication is that no usable version of the page is currently cached and that some other transaction is already attempting to obtain a usable version of the page. In this case, the current transaction will queue itself on the WAIT_QUEUE and suspend execution. The transaction will be resumed when the page becomes usable. The remainder of the fix_page processing depends upon whether the requested lock is for an update or a read of the page.

Assume that a transaction has issued a request to update a page. In this case, the BM will latch the page in the X mode by setting the X latch in the local CEC. Unlike in the case of a read request (explained below) in response to an update request, the BM does not pay attention to the L_short_message since it needs to ensure that the latest version of the page is in the local buffer pool before an update of the page can be allowed. If a U-mode lock is already held on the page, then the fix_page process returns to the caller immediately. If no U-mode lock is currently held, but has been already requested in response to another transaction's fix_page request, then the current transaction suspends itself, waiting for a grant of the earlier transaction request. Otherwise, the X latch is released and a U-mode P lock is requested after appropriately marking the U_LOCK_REQ and NEW_PAGE_REQ fields of the BCB, thereby letting others know that a U-mode lock and a new version of the page has been requested. The U-mode lock request is sent as a message by BM to the lock management. With the U-mode lock request, as an optimization, the VRSN value of the cached page could be sent. This could be useful if it helps the current owner (assuming there is one) to discover that the requestor already has the latest version of the page. The owner can compare the VRSN values and elect not to transfer the page if the requestor's version is the current one.

Upon a grant message from the lock management granting the U-mode lock, the BM updates the BCB by clearing the U_LOCK_REQ field and setting the U_LOCK_HELD field. At this point, the page is X-latched (by the BM setting the X latch) and a check is made to ensure that the latest version of the page is already present in the buffer pool. The message sent by the GLM 40 to grant the U-mode lock is accompanied by a P_short_message containing the VRSN value in the global lock table 100. When the BM receives the messages, it sets the X latch and compares the VRSN value received with the VRSN value of the version of the page in the buffer pool. If the VRSN value of the local page version is less than the VRSN value received, the PAGE_UNUSABLE and DOING_I/O fields are set in the BCB, and the PAGE_RECOVERY routine is used to read the page from DASD.

Assume that a read request has been received from a transaction. The page will be latched in the S mode by setting the S latch for the page. In the case of a read request, the BM does pay attention to L_short_message received with the lock grant message since the version of the page made available to the transaction does not always have to be the most current version. All that is required is that the version be at least as recent as that indicated by the page VRSN value present in the L_short_message. The S latch is set before comparing the VRSN value in the BCB with that received in the message. If the message value is smaller than or equal to the BCB value, then the fix_page processing returns to the calling transaction. Otherwise, a request for a new version of the page is issued, if such a request has not already been issued on behalf of another transaction. The request is made by issuing a notify_message to the owning DBMS. As in the case of the P lock request, the notify_message will cause the owner to send a P_short_message which is delivered by way of LLM/GLM/LLM. If no owner exists, the GLM will generate the message and send it via GLM/LLM. The transaction suspends while listening for the arrival of the P_short_message. Since the transaction has issued a read request, even though the medium fast page transfer scheme may be in effect, the owning DBMS does not write the page to disk in addition to transferring to the requestor. The transaction, once resumed by receipt of a P_short_message from lock management will obtain the S latch on the page and check to see if the desired version of the page has arrived by comparing the page VRSN value with the VRSN value in the L_short_message. If the desired version has arrived, the call returns. Otherwise, the MUST_RECOVER field is set to the same value as the owner_exists flag in the P_short_message. At this point, the page_recovery routine is invoked to obtain the required version of the page.

OWNER BM PAGE_TRANSFER PROCESSING

Refer to Table II and FIG. 2. When the page_transfer procedure is invoked in the BM of the DBMS owning a page, the procedure will first fix and S latch the page. This latching is required to transfer a consistent version of the page. If the page is dirty, a U-mode lock request has been submitted by the requesting system, and a write I/O for the page is not already in progress, then the owner BM will initiate an I/O for writing the page to disk. If COMM_LINK_TRANSFER is requested, the page will be transferred directly to the requestor. If a write I/O for the page is in progress, and the requested lock mode is U, then the procedure waits for the I/O to complete. Next, if the requested lock mode is U, a request to downgrade the P lock to the S mode is prepared by the owning BM and the new lock state is noted in the BCB of the owner BM. The page is unlatched and unfixed. The procedure then returns the P_short_message to the lock management, which forwards it to the requestor. At the same time, the owner submits a lock downgrade request. If the requestor seeks a U-mode lock, then the page_transfer procedure also passes the VRSN value of the page via LLM/GLM/LLM, allowing the GLM to update the VRSN value in the global lock table entry for this page.

REQUESTOR DATA_RECEIVE PROCEDURE

Refer now to Table III and FIG. 2 for an understanding of how a requesting BM receives a requested page and control information by way of the data_receive procedure. This procedure is invoked when a requested page arrives. If the transferred page arrives late because the requestor has already read it from the DASD, then, the transferred page is discarded.

If, when the procedure is invoked, the BCB does not exist, the implication is that the arrival of a previously requested page has been delayed. Since the P lock request or a notify call from fix_page triggers every page transfer, the BCB would exist if the requested page had arrived in a timely manner. If the BCB does not exist when the data_receive procedure is invoked, the received page is discarded.

Movement of the page by the procedure is indicated by the DATA_MOVED flag in the BCB. If this flag is marked "on", the page is cached in the buffer pool.

If the PAGE_USABLE field of the BCB is marked and a page arrives, the data_receive procedure must compare the VRSN value of the received page with the value in the BCB before overlaying it on the cached page. This is because of the uncertainty of the timely arrival of pages. The received page will be discarded if its VSRN value is less than or equal to the VSRN value of the cached page. Otherwise, it will be copied over the existing version. Because of record locking, a more recent version of an already cached page may arrive. One reader might have read a record from the cached version while another one requires a more recent version of the page for another record. The latter will trigger the transfer of the more recent version via a notify call to the owner from the requestor via the lock management.

Before overlaying an already cached page, the data_receive procedure X-latches the page to ensure that no transaction is actively reading the old version of the page. Multiple date_receive procedures are also serialized by the X latch on the page.

The data_receive procedure is invoked when a page sent by the owner arrives and, when invoked, it locates the BCB for the page. The page will be discarded immediately for the following cases: (1) the BCB does not exist, (2) the BCB DOING_I/O flag is set, or (3) in the BCB, the PAGE_USABLE indication is ON and the NEW_PAGE REQ flag is OFF.

If the BCB does exist, two cases are considered: in case (1), the page is unusable; in case (2), the page is usable.

In case 1, the data_receive process will X-latch the page. The procedure will immediately unlatch the page if the DOING_I/O, DATA_MOVED, or PAGE_USABLE field of the BCB is set. Otherwise, the procedure will copy the page, turn on the DATA_MOVED flag in the BCB, unlatch the page, and return.

In the second case, the DATA_RCV procedure will X-latch the page. Then, if the DOING_I/O flag is on or the NEW_PAGE_REQ flag is off, or if the VRSN value of the received page is found to be less than or equal to the VRSN value of the cached page, the procedure will set NEW_PAGE_REQ to off, latch the page and return. Otherwise, it will copy the page. If U_LOCK_REQUESTED is off, the procedure will wake up the transactions queued on the WAIT_QUEUE after setting NEW_PAGE_REQ to off. Then, the procedure will unlatch the page return. If the U-mode lock has been requested, then the wake up will be the responsibility of the transaction receiving the U-mode lock.

TABLE I

FIX_PAGE PROCESSING

Case 1 - BCB does not exist (i.e., the Page is not Cached)

TABLE I-continued
FIX_PAGE PROCESSING

1. Allocate a buffer and mark the BCB "Page-Unusable". "Data-moved" is set to Off.
2. Request the P lock. Mark the BCB field U-LOCK_REQ if U lock is requested.
   /*The lock is requested in S or U mode depending on whether the request-type is read or update.*/
   /*The lock manager returns a P_Short_message with the lock grant (the owner sent this message if the page was cached in another system; otherwise, it is generated by lock management. If Owner sent this message, Owner_Exists flag in P_Short_Message is set to YES, otherwise Owner_Exists is set to NO*/
3. Set S or X latch depending on request-type
   /* Serialize against the Data-Rcv */
4. If the BCB DATA_MOVED field is marked "On", then do
   a. If (Owner_Exists in P_Short_message = YES) and (page_version_number = version_number in the P_Short_message), then
      1) Mark the BCB "page_usable"
      2) Resume waiters, if any
      3) Return             /*Latch held    */
5. If (Owner-Exists in P_Short_message =NO) OR
                              /*Page was not shipped */
   (BCB is marked "Data_moved=Off") OR /*Data-Rcv didn't move data*/
   ((BCB is marked "Data_moved=On" /*An old Data-Rcv moved*/
   AND Owner_Exists in P_Short_message
       =YES) AND        /*stale page.*/
   (page_version_number < version-number in P_Short_message)) then do.
   a. Mark the BCB "Page_unusable, Doing-I/O"
      /*This would prevent Data-RCV exit from moving data after S latch is released. We don't hold latch across lock request and I/O*/
   b. Release latch.
   c. If Owner_Exists in P_Short_Message =Yes then Must-recover =Yes; /*Must-Recover flag is passed to
      else Must_recover =No. /*Page-Recovery Routine
   d. Call Page_Recovery_routine.
   e. S or X latch the page depending on request-type
   f. Return.
Page-Recovery Routine
   1. If Must_recover = Yes then do. /*Page was cached somewhere*/
      a. If BCB indicates "U_lock_held=No, Request P lock in U mode with "Comm_link_transfer=No".
         /*The request for U lock would make the owner write the page to disk. Note that the owner does not write the page to disk when S lock is requested on the page. Hence the need to get the lock in U mode*/
         After the lock is granted, mark the BCB "U_lock_held=Yes".
      2. Read the page from disk.
      3. When I/O completes,
         a. Mark the BCB "Page_Usable, Doing I/O=No, New_page_requested=No".
         b. Resume waiters, if any
         c. Return
Case 2 - BCB exists
   1. Chk-BCB-Again:
      If the BCB is marked "Page_Unusable" then
      a. Queue this transaction in the Waiter_q (anchored from the BCB).
      b. Suspend the transaction. (The transaction is resumed when the pages becomes usable.)
/* = = = = = = = = = = = = = = = */
/*Processing of the Update Request Below*/
/* = = = = = = = = = = = = = = = */
   2. If the Request-type=Update then do.
      a. X latch the page
      b. Chk-U-again:
         If ("U_lock_held = No") then do.
         1) Release X latch      /*Don't hold latch across lock request*/

2) If "U_lock_requested= No" then do.   /* U lock not requested yet*/
      a) Mark the BCB "New_page_requested=Yes"
      b) If interference then go to Chk-BCB-again.
                              /*if an I/O is in progress*/
                              /*as a result of S lock, wait*/
      c) Mark the BCB "U_lock_requested=Yes"
      d) Request the U lock.
         /*(it is possible to send the version-number of the cached page when the U lock is requested. This is useful for the case when the requester has the current version of the page. The owner can compare the version-numbers and not ship the page if requestor's version is current.)*/
      e) When the U lock is granted, mark the BCB "U_lock_held"=Yes. /*Owner_Exists in P_Short_message would be yes if U lock was held by another system and it shipped the page, otherwise it would be no*/
      i. If_Owner Exists in P_Short_message = YES then do.
         /*(Check if the shipped page has been moved by Data-Rcv or not.)*/
         i) X latch the page
         ii) if (page_version_number) < (version-number in P-short message) then do.
            1. Mark the BCB "Page_unusable, Doing_I/O"
            2. Release X latch
            3. Must_recover = No.
               /*U lock held, disk version is good*/
            4. Call Page-Recovery routine.
            5. X latch the page
            6. If "U_lock_held"=No then do
               /*Did U lock get stolen while waiting for the latch*/
               a. Release X latch
               b. Goto Chk-U-again
            7. Return
               /*page-VRSN < VRSN in P_Short_msg*/
         iii) Else do /*Page moved by Data-Rcv is good*/
            1. Resume Waiters, if any
               /*These are U lock waiters or waiters for the new page*/
            2. Return.
      ii) Else do
            /*Owner_Exists P_Short_msg=NO, check if cached page can satisfy the request*/
         i) If (VRSN in P_Short_message > page-version-number) then do.
            1. X latch page
            2. Mark the BCB "Page_unusable, Doing_I/O"
            3. Release latch
            4. Must_recover = No.
               /*U lock held, disk version is good*/
            5. Call Page-Recovery routine.
         ii) Resume waiters, if any
               /*U lock waiters or new page waiter*/
         iii) X latch the page
         iv) Return
   3. Else do.       /*U-lock already requested*/
      a) Queue this transaction in the Waiter-q via compare double swap (CDS) instruction
      b) If interference then goto Chk-U-again

TABLE I-continued
FIX_PAGE PROCESSING

```
              /*CDS failed, redrive*/
    c) Suspend the transaction
    d) Goto Chk-U-again
              /*Redrive after wake up*/
  c. Else Return.  /*U lock is already held; return with
                       X latch held*/
/*= = = = = = = = = = = = = = = = */
/*Processing of Read Request Below*/
/* = = = = = = = = = = = = = = = = */
3. Check-again: S latch the page.
   /*(The latch is acquired to serialize against the
   Data-Rcv exit which can be in process because of a U
   lock request or because a new version of the page has
   been requested. Latch the page before comparing the
   page-version-number.)*/
4. If (version-number in L-Short-message <=
   page-version-number) then Return
             /*This cached version can be used*/
5. If (version-number in L-Short-Message >
   page-version-number then do.
             /*New version of the page required*/
   a. Release S latch
   b. If the BCB is marked "New_page_requested=Yes"
      then do.
      1) Queue this transaction in the Waiter-q.
      2) If interference then goto Check-again.
         /*CDS failed *e.g., Interference
         could be if Data-Rcv set
         "New_page_requested=No"*/
      3) Suspend the transaction. (The transaction is
         resumed by the Data-Rcv exit or U lock
         requestor.)
      4) Goto Check-again.
   c. Else do. /*First one to detect the need for a new
      version*/
      1) Mark the BCB "New_page_requested=Yes"
      2) If there is interference, then goto
         Chk-BCB-again.
      3) Issue a Notify to the U lock holder
         (owner) to "send the page".
         /*(The NOTIFY will cause, like a P lock
         request, a P_short_message to be sent by the
         owner of the page or by lock management.
         This avoids the need for setting time limit
         for page arrival*/)
         The transaction would be suspended here. It
         is resumed by the Lock Manager when the
         P_short_message arrives.
      4) S latch the page
                    /*This is to ensure Data-Rcv is not
                    moving data*/
      5) If (version-number in L-Short-message >
         page-version-number) then do.
                    /*New version didn't arrive,
                    recover the page*/
         a) X latch the page
                    /*To recover the page, get readers
                    out*/
         b) Mark the BCB "Page-unusable, Doing-I/O"
         c) Release X latch.
         d) Must-recover = Yes.
                    /*Get U lock to recover the page*/
         e) Call Page-Recovery routine.
         f) S latch the page
      6) Return
```

In fix_page processing, when a new version of the page is received, all waiting transactions are woken up. It is possible to improve the processing somewhat by having Data-Rcv awaken only those waiting transactions whose VRSN requirement is satisfied by the page just received. Data-Rcv would issue a page request for the latest version of the page if the WAIT_QUEUE is non-empty. This would require tracking the VRSN required by each waiter in the waiter-q-element and additional logic in the Data-Rcv exit.

TABLE II
PAGE TRANSFER (OWNER SYSTEM)

BM (in the owner system) performs the following:
1. Locate the page in the bufferpool and fix it.
2. S Latch the page.
   /*This is required to transfer a consistent version of the page. (The update transaction acquires X latch to update the page.)*/
3. If (the page is dirty) AND (the requested lock mode is U) then initiate the disk write.
4. If Comm-link-transfer = Yes then do.
   • Copy the page and set up the control-information.
   • Ship the page.
5. If (write I/O for the page is in progress) AND (requested lock is U) then wait for the I/O to complete.
6. If the requested lock mode is U, then setup for downgrade of the P lock to S.
   NOTE the new lock state in the BCB.
7. Unlatch the page.
8. Unfix the page.
9. Return to the Lock Manager with the P-Short-message and downgrade lock request, if any. If the requested lock is U, provide the version-number. The Lock Manager will update the version-number in its lock-table.
10. EXIT

TABLE III
DATA RECEIVE

The following are important points concerning the processing done by DATA_RCV procedure:
- If the BCB doesn't exist when the Data-Rcv is invoked, it infers that it is a delayed arrival of a previously requested page. Since the P lock request from fix_page triggers the page transfer, the BCB would exist if the page arrived in a timely manner. If the BCB does not exist when the Data-Rcv is invoked, the received page is discarded.
- To know whether the page has been moved by Data-Rcv or not, the BCB has a flag "Data_moved" as one of the possible page states. The page is cached if the BCB is marked "Page_unusable" and "Data_moved=On". The page is not cached if the BCB is marked "Page_unusable" and "Data_moved=Off".
- Even if the BCB is marked "Page_usable", a more recent version of the page may arrive, because of record locking. One reader could read its record from the cached version while another one requires a more recent version of the page for another record. The received page could be more current than the cached version due to intervening updates.
  However, the version-number of the received page must be inspected before overlaying it on the cached page. This is because of the uncertainty of the timely arrival of pages. The received page will be discarded if its version-number is less than or equal to the version-number of the cached page.
- To overlay an already cached page, Data-Rcv gets an X latch on the page. Readers get S latch to use the page, updaters get an X latch.
  Multiple Data-Rcv exits are also serialized by the X latch.

The Data-Rcv process locates the BCB for the page. The page would be discarded immediately for the following cases:
1. The BCB does not exist
2. BCB indicates "Doing_I/O"
3. BCB indicates "Page_usable" AND "New_page_requested=NO"
   If the BCB exists then there are 2 cases, the page is unusable or the page is usable.

Case 1 - Page_Unusable
1. X latch the page. /*Serialize against FIX_PAGE*/
2. If the BCB is marked "Doing I/O" or "Data_moved=ON" OR "Page_Usable=Yes"
   then do. /*After getting X latch, recheck flags*/
   a. Release the latch

TABLE III-continued
DATA RECEIVE b. Exit
/*(The transferred page is a stale version, so discard it. The only case when Data-Rcv would continue its processing is when the BCB is marked "Page—unusable, Data—moved = OFF"*/
3. Copy the page.
4. Note the version-number (of the page) in BCB
5. Mark the BCB "Data—Moved=On".
6. Unlatch the page
(This would resume the FIX—PAGE of the requestor which issued the P lock request, if it was waiting.)
7. Exit.
Case 2 - Page-usable
1. X latch the page. (This is to serialize against the readers, updaters and the Page-recovery routine.)
/*After the X latch is obtained, recheck flags - see below*/
2. If (the BCB is marked "Doing-I/O") OR /*This is the write I/O*/
/*of a dirty page or read I/O because of page recovery*/
/*must be a stale version*/
(BCB is marked "New—page—requested=NO"
OR /*New page already rcvd*/
(version-number of received page<= /*Stale version*/ page-version-number of the cached page)
then do.
   a. Mark "New—page—requested=No"
   b. Unlatch the page
   c. Exit.
3. Copy the page
4. Note the page-version-number in BCB
5. If "U—lock—requested=No" then do. /*If U lock is requested then waiters are woken up after U lock is gotten*/
   a. Swap the Waiter-q
   b. Set "New—page—requested=No"
6. Unlatch the page
7. If Waiter-q swapped then Resume waiters
/*Waiting for new version of the page*/
8. Exit.

Refer now to FIGS. 2 and 3A-3C for an example showing use of the VRSN value in connection with record locking to detect the presence of a dirty page in an owner's buffer pool when the page is requested by another system. Assume initially the page P1 does not currently reside in any buffer pool, but that it is available on disk. In step 200 of FIG. 3A, a transaction Tx2 in the CEC 12 requests a read on a record R2 in the page P1, in response to which its DM 20 in step 202 sends a lock request message for an S-mode L lock to the LM 40 by way of its LLM 18. Accompanying the lock request is a verify request asking for the current value of VRSN for the page P1 which contains R2. Assume the same sequence slightly delayed, in CEC 14 for a second transaction Tx1 except that an X-mode L lock is requested on record R1 in page P1. These steps are 204 and 205 in FIG. 3A. The GLM 40 in response to each L lock/verify request accesses the global lock table, finds no record for page P1. In steps 206 and 207, the GLM sends a message to the requestor granting the requested locks and returning, in an L—short—message, the default zero value for the VRSN. When the grant lock message/short—message is received in step 208 by the DM 20, it initiates fix—page processing by a request for the page to the BM 24. The BM 24 in step 209 begins fix—page processing according to case 1 in Table I building a BCB for P1 and sending a message requesting an S-mode P lock. The message sent requesting the P lock elicits a grant message from the lock manager in step 210 which includes a P—short—message. The P— short—message has two relevant fields: OWNER—EX-ISTS and VRSN value. In this case, absence of a U-mode lock causes the first field to be set to "NO", while lack of an update causes the second field to be set to 0. Now, in steps 211-216 the fix —page processing begins step 5 (Table I), and executes substeps a-f by calling the page—recovery routine and obtaining the page P1 from the disk. Assume that the disk version of the page has VRSN=98. Now the transaction Tx2 reads record R2 and completes its processing. Since the process was a read, no updating log entries were created and the VRSN number of the page remains the same. The DM 22 requests release of the L lock.

Now in step 221, slightly delayed from the acquisition of the page P1 by the BM 24, the L—short—message received in step 207 by the DM 32 in the DBMS 30 of CEC 14 is passed to the BM 34 in a fix—page call. In steps 222-224, the BM 34 does fix—page processing according to case 1 in Table I, building a BCB for P1 and sending a message requesting a U-mode P lock. This request results in a grant from the lock manager which includes a P—short—message. Since the existing P lock on page P1 held on behalf of the BM 24 is an S-mode lock and the page has not been updated, the GLM sets the OWNER—EXISTS field to NO and the VRSN value to 0. Now (in step 224) the fix—page processing of the BM 34 goes to step 5 of Table I, executes substeps a-f, and obtains the page P1 from the disk. Note that the VRSN value of the page P1 is still 98.

Figure 3B:
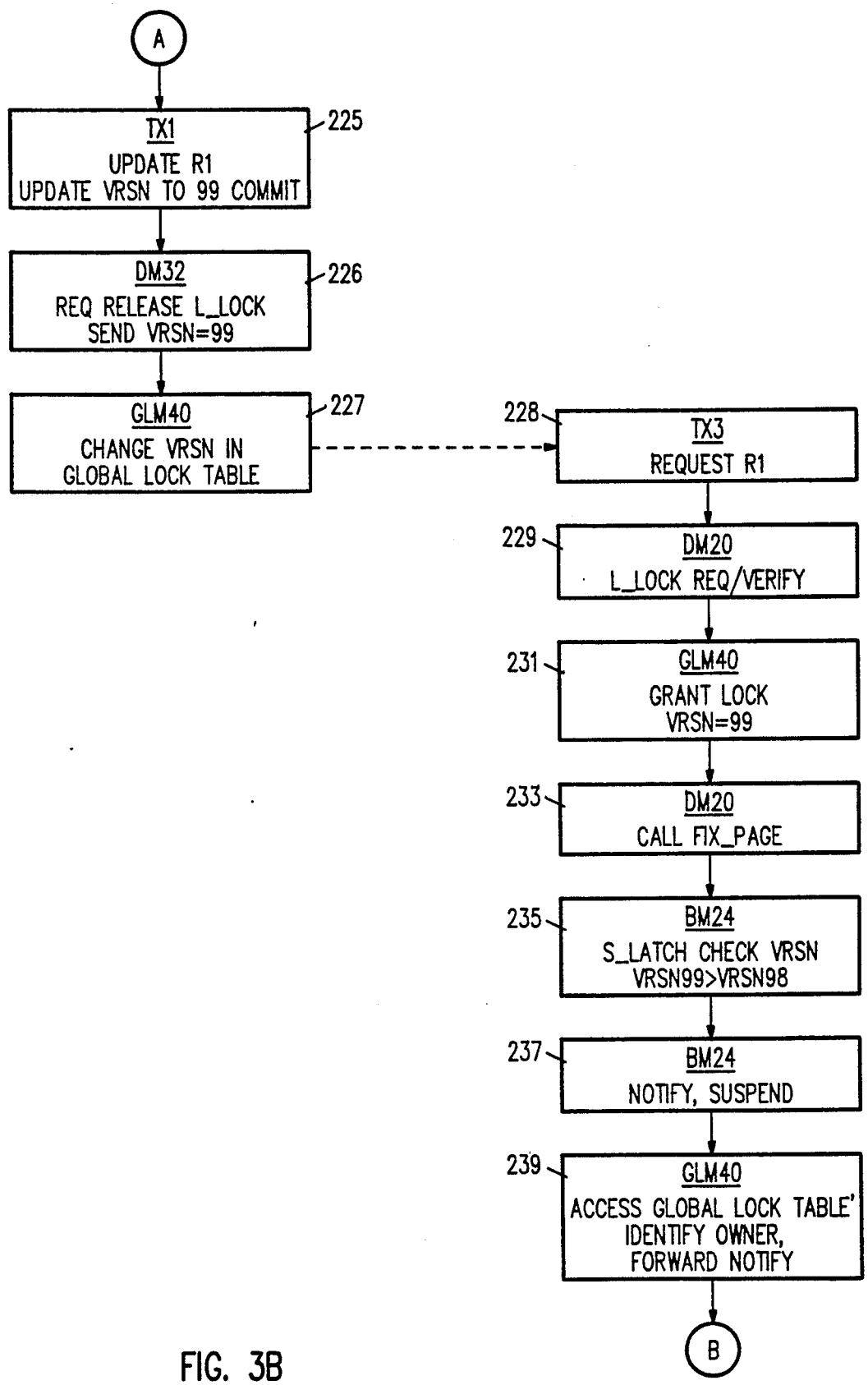
FIGS 3A', 3A", 3B and 3C form a flow diagram representing detection in one DBMS instance of an updated data unit in another DBMS instance and transfer of the updated data unit between the instances.

Referring now to FIG. 3B, the transaction Tx1 in step 225 updates the record R1, obtains the log value for LSN resulting from logging of the update and updates the VRSN fields of the BCB and the page. In step 225, the VRSN value is updated to 99 in the BCB and the new version of the page P1 in the buffer pool 36 of the CEC 14. The transaction is then committed and then an unlock request message is sent to the lock manager requesting release of the L lock on R1 and for P1 providing the VRSN value of 99 resulting from the update. When the request is received in step 227, the GLM 40 changes the VRSN value in the corresponding record of P1 and then processes the unlock request, releasing the L lock on R1. Note that the U-mode lock held by the BM 34 which is entered into the MODE field of the corresponding global lock table record has not been released.

At this point in FIG. 3B when step 227 is completed, a dirty version of page P1 is cached in the buffer pool 36 with a VRSN value of 99, this value will have been entered into the lock record for the page P1 in the global lock table, and an earlier version of the page (number 98) has been cached in the buffer pool 26 of the DBMS 16. Now, any lock or verify request received by the GLM for the page P1 will be provided with a trail in the form of a VRSN value in the lock record for the page P1 in the global lock table as long as P lock is held on P1 by any system. Recall that the lock record will record the owner of the U-mode P lock; in this case the owner is BM 34.

In step 228 of FIG. 3B, a third transaction Tx3 in CEC 12 causes DM 20 to issue an L lock/verify request in step 229 to obtain a lock on record R1 and verify VRSN for P1. In step 231, the GLM 40 checks the global lock table, finds the entry for record P1, obtains the updated VRSN value of 99, and sends a grant/L— short—message back to the DM 20. When the grant is received, the DM 20 in step 233 passes the VRSN value to BM 24 which executes case 2 of its fix—page process in step 235. Since the page is usable and an update request has not been received, processing begins at step 3 of case 2 of Table I, the page is S-latched locally and the VRSN value is checked against the VRSN value in the BCB. Since the VRSN value in the L_short_message is greater than the value in the BCB, step 5 is executed. At this point, the need for a new version of the cached page is detected and the processing is directed to transferring the new version of the page into the buffer pool 26.

Figure 3C:
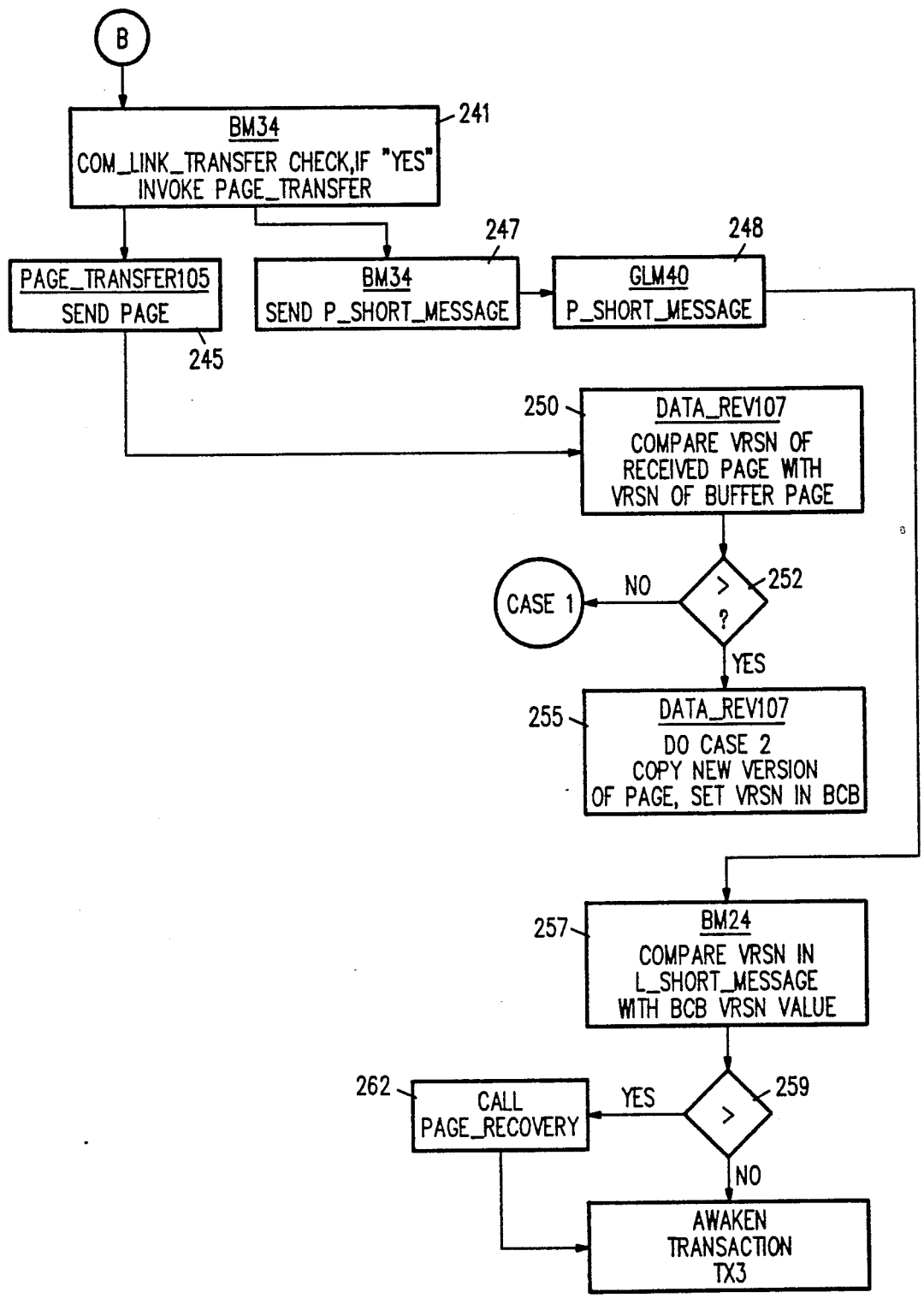

Refer now to Table I, step 5 of case 2, FIG. 2, and FIG. 3B to understand the transfer sequence according to the invention. In step 5, of Table I, the S-latch is released, it is assumed there are no contending requests submitted to the DBMS 16 for page P1 and the processing proceeds to step 5.c. Assume that the steps 5.c.1) and 2) are completed. In step 5.c. (step 237 of FIG. 3B) the BM 24 issues a notify addressed to the owner (BM 34) of page P1 via GLM 40. The notification is to "send the page". Now the processing suspends until the P_short_message is sent. The notify message is forwarded through the lock management in step 239 to the BM 34 and initiates its page transfer process, described in Table II. Refer now to FIG. 3C. In step 241, in response to the notify forwarded to the BM 34, BM 34 locates the page in the buffer pool, S-latches the page and moves to step 3. In this case the page is dirty but the request is for an S-mode lock so step 3 is skipped. In step 4 the COMM_LINK_TRANSFER default setting is "yes". Assuming default setting, the page P1 is copied, control information required is set up and the page and the information is sent to CEC 12 via comm link 50 in step 245. In this example, steps 5 and 6 of Table II are skipped, in step 7, the page is unlatched, in step 8, the page is unfixed, in step 9 of Table I, a P_short_message is sent through the lock management to the CEC 12. This corresponds to steps 247 and 248 of FIG. 3C. It should be evident that there will be a race between the P_short_message and the transferred page. It is assumed that the message time through the lock management is longer than the time to transfer the message over the comm link 50 directly, therefore, assuming normal operation, the page will be received at the CEC 12 before the P_short_message.

At step 250 of FIG. 3C when the page is received, together with the control information, the data_receive procedure of Table III in the CEC 12 is invoked.

Referring now to Table III and to FIG. 3C, the BCB for page P1 does exist when the data_receive procedure is invoked because of the previous transaction, and the page is marked as "usable" in the BCB PAGE_USABLE field. At this point, the process considers whether the page is more current than the cached version by comparing version numbers in step 252 of FIG. 3C. In this example, this is precisely the prevailing condition. In this case, case 2 of Table III is followed (step 255 of FIG. 3C) since the prior version of the page in the buffer pool 26 was usable. Thus, the page is X-latched, none of the conditions of Table III step 2 are met and the page is copied, its VRSN value is copied into the BCB, and since no U-mode lock was requested, step 5 is executed, the page is unlatched the waiting transaction is awakened and the process is exited.

Returning now to step 5.c.3) of Table I (step 257 of FIG. 3C), it is assumed that the page has been entered by the data_receive process by the time the P_short_message arrives. Therefore, when the BM fix_page process is awakened, the page is S-latched and the version number in the buffer pool is compared with that received in the L_short_message in step 259 of FIG. 3C. If the message value is greater than the value in the BCB, the assumption is that the new version did not arrive, requiring recovery of the page (step 262 of the Figure). Otherwise, the page has arrived, been entered into the buffer pool, its VRSN value updated, and the page is therefore available to the suspended transaction.

SINGLE SYSTEM RECOVERY

With reference to restart recovery after a system failure, (an approach to which is discussed in the IBM RESEARCH REPORT RJ6649, January, 1989, and revised November, 1990, which is entitled "ARIES: A Transaction Recovery Method Supporting Fine Granularity Locking and Partial Rollbacks Using Write-Ahead Logging" by C. Mohan et al.) the following points should also be noted:

During the undo pass, the U-mode lock must be reacquired on an affected page if it is not already held. This U lock acquisition will not cause deadlocks since, even during normal processing, U locks are not involved in deadlocks.

A page involved in redo recovery (i.e., a page for which the U lock was held at the time of system failure) is transferable to any other system which needs it after the redo pass is completed. If the failed system is in its restart recovery, then LM would queue the incoming remote lock request until the failed system indicates that its page-transfer procedure is enabled. The transaction system would enable the page-transfer procedure at the end of the redo pass (i.e., after "repeating history" for all the missing updates).

SUPER-FAST SCHEME

With the fast scheme, since a dirty page's ownership is transferred without first writing it to disk, the page's RLSN has to be tracked at GLM to recover the page correctly in case the new owner fails before the page is written to disk. To accomplish this, a value for RLSN is provided when the U lock is requested for a page.

Assigning and Tracking RLSN

The RLSN is assigned by the DBMS and tracked by lock management, BM assigns and tracks RLSN in the BCB when a U-mode lock is requested for a page or whenever the page's state changes from nondirty to dirty. The BM chooses as RLSN the LSN that would be associated with a log record if it were to be written now (essentially the end-of-low LSN). LLM and GLM initialize the RLSN field of a lock table entry to the maximum number that can be stored in that field (referred to as Hi-Value). An RLSN value of Hi-Value for a page implies that no recovery is needed for that page. When a U-mode lock is requested for a page, the P lock request would include the RLSN value assigned by BM. But would request that the value be set conditionally by lock management. Lock management (LKM) would set its RLSN to that value if the current RLSN value at LKM is Hi-value. This means that when a dirty page's ownership is being transferred from one system to another, without the page being written to disk, the RLSN value at LM is not modified. In any case, LM would return to BM the RLSN value that it has after processing the lock request. When a U-mode lock is released or downgraded to an S-mode lock without the ownership of the page being transferred to another system (which can happen only after the current owner writes the page to disk) lock management can set RLSN to Hi-Value.

To reduce the log range that would have to be processed for page recovery, BM in the owning system pushes the RLSN forward after writing the page to disk but before it is dirtied again by asking LKM to set RLSN to Hi-value unconditionally. In this case, when the page becomes dirty again, BM would have to first update RLSN at LKM before allowing the update to take place. Alternatively, the RLSN can be pushed after the page becomes dirty again to the higher value tracked in the BCB without the value being set at LKM to Hi-value in between. Pushing the RLSN forward is not required by the methods presented here. This is an optimization to reduce the range of the log that would have to be scanned in case a failure happens and the page needs to be recovered.

Fix_Page Processing

The inputs to fix_page are the same as for the Medium speed scheme. The processing is similar to that for the Medium scheme except for the following:

RLSN (=Current-end-of-log LSN) is set conditionally when the P lock is requested in the U mode. Note the RLSN returned from the lock manager in the BCB. The RLSN is tracked in the BCB to push it forward after a write to disk.

Since a dirty version of a page may be transferred when the U lock is requested, such a page is queued in the Dirty_Q after the page is marked usable.

When a page sent by an owner is not received by the time the U lock is acquired by the requesting system, during the processing performed in the Page Recovery routine, after reading the page from disk, the log must be processed from RLSN to recover the page.

BM Procedure for Page Transfer (Owning System)

When the BM page-transfer procedure is invoked in the system owning a page, if Comm-link-transfer=No is specified, then the Medium scheme would be used. Typically, this option would be used when the lock is requested to make the owner write the page to disk. Otherwise, the procedure would first fix and S latch the page. This latching is required to transfer a consistent version of the page. If the page is dirty, the U-lock is requested by the other system and a write I/0 for the page is not in progress, then, if necessary, the log is forced up to the LSN of the page and the page is removed from the Dirty_Q. If the page was removed from the Dirty_Q, then Page-dirty=ON is set in the control-information that will be sent to the requestor. The page is shipped directly to the requesting system along with the control information. If write I/0 for the page is in progress and the mode of the requested lock is U, then the procedure waits for the I/0 to complete. Next, if the requested lock mode is U, then the request to downgrade the P lock to the S mode is prepared and the new lock state is noted in the BCB. In this case, the procedure will also pass on the LSN of the page for lock management to update the LSN value in its lock table for this page. The page is unlatched and unfixed. The procedure then returns to LM with the P-Short-message and, possibly, the downgrade request.

Data Receive Procedure

The processing in the Data-Rcv procedure will differ from that described in the Medium scheme if a dirty page were shipped, as will be indicated by the control-information accompanying the page. The following additional processing is required:

Mark the BCB to indicate that the page is dirty.

Recovery from a Single System Failure

The lock management for a DBMS was described above as consisting of a GLM in conjunction with a local lock manager for the system. In order to deal with a failure of GLM, the inventors assert that a back-up GLM would be defined for monitoring the state of the primary GLM to determine when to take over the functions of the primary. When the back-up GLM takes over, it communicates with all LLMs to reconstruct the global lock table information. When the GLM notices that an LLM has failed, it will release all the locks held by the failed LLM except those which the LLM has specifically asked to be "retained". To recover from the failure of multiple systems in the shared disk complex of FIG. 1, the global lock table of the GLM is periodically checkpointed.

Now consider the case when the page P locks and their RLSNs are available from the GLM at a system restart. A page which needs redo recovery would have a U-mode lock held and its RLSN will not be equal to Hi-value. The minimum of the RLSNs of all the pages for which U-mode locks were retained by the recovering system is taken into account in computing the start point for the log scan of the redo pass. The merged log is scanned during the redo pass for redoing any updates which might be missing from the pages. A log record's update would be redone only if the U lock is held and the page's LSN is less than the LSN of the log record. The log is scanned up to END-LSN (the last log record written by the recovering system before it failed).

If a system requests a page lock which is retained in the U mode and the failed system has not begun its recovery processing, then GLM can grant the lock to the other system along with the message "You Recover the page". This improves availability to the data. GLM can indicate the need for recovering the page before its use via the P-Short-message which is sent to the requestor. With this enhancement, if only the S-mode lock were requested, then GLM will grant the U-mode lock.

The P-Short-message would have the following additional information:

1. Indicator-"You recover the page"
2. System-ID of the system which retained the lock.

The requestor can query the system merging the local logs to determine the End-LSN of the failed system that held the U lock. As before, the RLSN kept at GLM would be returned when the lock is granted. The requestor can then read the page from disk, scan the merged log from RLSN to End-LSN of the failed system and recover the page. When such a recovery is done, the recovered page is marked dirty and placed in the Dirty_Q.

If the failed system has already begun its recovery processing and a retained P lock is requested by another system, then the lock is transferable only after the redo pass of recovery is completed. This is the same as the method described for the Medium scheme. During undo, U-mode locks would have to be reacquired on the affected pages if they are not already held.

Recovery from a Complex (Environment-wide) Failure

A shared disk-complex failure is characterized by the loss of all the retained locks and their RLSNs. In such an event, the start point for the redo processing scan of the log cannot be determined as in the case of a single system failure. Also, since a page can be transferred while it is dirty, there is a time period when it is in transit and it does not belong to any system. This can jeopardize the recovery of a page. An example of the problem was given earlier and the need for periodically checkpointing GLM's lock table was explained.

Checkpointing of the GLM Lock Table

Periodically, a system takes a GLM checkpoint by first writing a begin_GLM_checkpoint log record and then requesting the IDs of all pages and associated RLSNs for pages with RLSNs not equal to Hi-value from GLM and writes them into an end_GLM_checkpoint log record. The frequency of the checkpoint can be based on the number of log records written in the SD-complex by the different systems.

The following is required to determine the restart redo point after an SD-complex failure:

1. The end_GLM_checkpoint log record must be accessed and, based on its contents, the minimum of the RLSNs must be determined. If no page had an RLSN value smaller than Hi-value when the GLM lock table checkpoint was taken, then the above minimum is set to be the LSN of the begin_GLM_checkpoint log record.

2. The merged log must then be processed starting from the LSN which is the minimum of the LSN of the begin_GLM_checkpoint log record and the LSN determined in the previous step. This processing, called "redo recovery", processing can include a method such as is described in the IBM RESEARCH REPORT RJ6649, published in January, 1989, and revised November, 1990, which is entitled "ARIES: A Transaction Recovery Method Supporting Fine Granularity Locking and Partial Rollbacks Using Write-Ahead logging" by C. Mohan et al. Until the redo scan reaches the begin_GLM_checkpoint log record, only log records relating to pages in the GLM checkpoint log record need to be processed. After that point, all log records would have to be processed until the end of the log is reached.

Super-Fast Scheme

This scheme is described as changes to the Fast scheme.

The control-information which is shipped with the page contains the following additional information to track whether the log records of the updates to this page by other systems have been externalized or not. The format of this additional information is as follows: there are a fixed number of slots (e.g., 8) where each slot contains a system-ID and the highest LSN of the log record written by that system for the update of the page before the page was transferred. If no slot is available, then the log would be forced by this system before the page transfer.

BM on the owner side

If a slot is available, the system-ID and the page LSN are placed in it. The log is not forced.

If no slot is available, the log is forced before the page transfer.

The fix_page processing is the same as for the Fast scheme.

The Data-RCV procedure gets the extended control-information and anchors it from the BCB.

Hi-LSN Broadcast Procedure

Periodically, each system sends its Hi-LSN to GLM to indicate how far the log has been externalized in that system. GLM locates entry corresponding to the system-id and replaces its Hi-LSN with the provided value. Periodically, GLM informs the other systems of the Hi-LSN via a message which invokes a procedure in the receiving system. The called procedure's processing is as follows:

each system has a vector of the system's-IDs and their respective Hi-LSNs. This vector is updated based on the message from GLM.

Additional processing in the process which writes dirty pages to disk:

Before writing the page to disk, the process checks for every slot whether the slot's LSN is less than or equal to the slot's system's Hi-LSN. If not, it issues a Notify with Ack to the appropriate system asking it to force its log up to that slot's LSN. If a system does not respond because it has failed, then the page is recovered from the merged log starting from the RLSN to the log point when the page recovery was initiated.

Single system recovery:

If the failed system held any U lock, the merged log is scanned from the RLSN to the time of failure. Note that the log merge process would cause log records in all systems to be externalized up to the time of failure and hence covers the case when a non-failed system can have a unexternalized log record at the time of page recovery which gets externalized later because the transaction commits. The page recovery would miss this log record if the log is not forced in the non-failed system.

The other processing is the same as that described for the Fast scheme.

The complex recovery is the same as that for the Fast scheme.

Enhanced Data Availability

When the Medium scheme is in use, data availability can be further improved by taking some additional steps during certain failures. If a system were to fail while holding the U lock on a page, and another system were to need the same page, then GLM can grant the P lock with an indicator "You recover the page". This can be done with record locking since the locks on uncommitted records would still be held by the failed system. This would provide better data a availability because, if the requesting system were able to get a lock on a record that it needs to access and which is present in that page, then it would be able to access that record before the failed system recovers.

Next the details of how BM and GLM support this enhanced availability are discussed.

GLM supports an option which can be specified with a lock request whether a lock is transferable or not while it is retained. This option allows a P lock to be transferred to another system even though it is retained. Note that the lock is transferable only if the failed system is not in its restart processing (e.g., it has not yet connected to LM during its restart). If the failed system is undergoing restart, then the page can be transferred only after the redo pass is completed.

BM provides the RLSN (the Current-end-of-log) to LM when it requests the P lock in U mode and an indicator that the lock is transferable while retained.

The RLSN is maintained by LM and pushed forward after a write I/0 by BM as explained earlier.

When a requestor requests the P lock which is retained and the failed system is not in its restart recovery processing, GLM indicates to the requestor "You recover the page from RLSN r of System a" and grants it the U lock.

GLM has an additional field in the lock name entry for the system-ID whose log is needed for recovery. However, when GLM tells a requestor "You recover the page", the system-ID of the lock owner would be different from that for the recovery log. The requesting system, after recovering the page and writing it to disk, will issue a request to LM to set its system-ID for the recovery log.

BM in the requesting system recovers the page by scanning system a's log from RLSN r to a's end of log.

In the practice of this invention, a central electronic complex can include, for example, a mainframe digital computer of the multi-processing type. An example of such a computer is the IBM 3090 series machine, particularly the Model 600. As is known, the Model 600 can execute a plurality of processes including a DBMS instance of the DB2 type.

We claim:

1. In a system for sharing access to data among a plurality of database management systems (DBMS's) by issuing locks to processes executing in the DBMS's, the data being held in units of transfer ("data units") in DBMS buffers or being copied to the DBMS buffers from one or more disks to which all of the DBMS's are coupled, the locks being issued and managed by a global lock manager to which each of the DBMS's is coupled by a respective communications link, the locks including P locks on data units and L locks on records in the data units, the system including means for coupling each DBMS to all other DBMS's for transferring data, a method for providing fast access to data units, the method comprising the steps of:

maintaining a global lock table at the global lock manager, the global lock table including one or more entries, each entry corresponding to a lock granted to a DBMS;

issuing a P lock for updating a data unit to a first DBMS;

entering an entry for the P lock in the global lock table;

providing a first version of the data unit from a disk to a buffer of the first DBMS;

generating an updated version of the data unit in the buffer by updating the first version of the data unit at the first DBMS;

in response to updating the first version of the data unit:

generating a version number for the updated version of the data unit in the buffer of the first DBMS, the version number being a monotonically increasing number;

attaching the version number to the updated version of the data unit in the buffer of the first DBMS; and storing the version number in the entry for the P lock in the global lock table;

issuing a request from a second DBMS for an L lock to read a record in the data unit;

in response to the request for the L lock, providing the second DBMS with the version number stored in the global lock table and granting the L lock;

if a buffer version of the data unit is in a buffer of the second DBMS, comparing the version number in the buffer version of the data unit with the version number from the global lock table and requesting the data unit from the global lock manager if the version number in the buffer version of the data unit is less than the version number from the global lock table; otherwise, if no version of the data unit is in a buffer of the second DBMS, issuing a request from the second DBMS for a P lock to read the data unit;

providing a request from the global lock manager to the first DBMS to transfer the data unit to the second DBMS in response to the P lock request;

transferring the updated version of the data unit from the first DBMS to the second DBMS and providing the version number of the updated version of the data unit from the first DBMS to the global lock manager;

forwarding the version number received from the first DBMS by the global lock manager to the second DBMS;

if the version number provided to the second DBMS is greater than the version number in the updated version of the data unit received by the second DBMS or if the updated version of the data unit has not been received at the second DBMS when the version number arrives, writing the updated version of the data unit to a disk from the first DBMS, providing the updated version of the data unit to the second DBMS from the disk and reading the record; otherwise, reading the record from the updated version of the data unit transferred to the second DBMS from the first DBMS.

2. The method of claim 1, wherein the system further includes a plurality of transaction logs, each transaction log coupled to a respective DBMS for storage of log data, each version number including a log sequence number (LSN) corresponding to an entry in a transaction log coupled to a DBMS recording updating of a data unit.

3. The method of claim 2, further including the steps of:

maintaining recovery version numbers for a plurality of data units in the global lock table, each recovery version number including a log sequence number representing a first update to a data unit following providing the data unit from a disk to a DBMS;

detecting failure of an owning DBMS holding a P lock to update a data unit before the data unit is written to disk; and at a requesting DBMS, recovering the data unit by obtaining the recovery version number for the data unit from the global lock table, obtaining from the transaction log of the updating DBMS updating log entries for the data unit having LSN's equal to or greater than the recovery version number of the data unit, and applying the update log entries to the data unit in version number sequence.

4. In a system for sharing access to data among a plurality of database management systems (DBMS's) by issuing locks to processes executing in the DBMS's, the data being held in units of transfer ("data units") in DBMS buffers or being copied to the DBMS buffers from one or more disks to which all of the DBMS's are coupled, the locks being issued and managed by a global lock manager to which each of the DBMS's is coupled by a respective communications link, the locks including P locks on data units and L locks on records in the data units, the system including means for coupling each DBMS to all other DBMS's for transferring data, a method for providing fast access to data units, the method comprising the steps of:

maintaining a global lock table at the global lock manager, the global lock table including one or more entries, each entry corresponding to a lock granted to a DBMS;

issuing a P lock for updating a data unit to a first DBMS;

entering an entry for the P lock in the global lock table;

providing a first version of the data unit from a disk to a buffer of the first DBMS;

generating an updated version of the data unit in the buffer by updating the first version of the data unit at the first DBMS;

in response to updating the first version of the data unit:

generating a version number for the updated version of the data unit at the first DBMS, the version number being a monotonically increasing number;

attaching the version number to the updated version of the data unit in the buffer of the first DBMS; and storing the version number in the entry for the P lock in the global lock table;

issuing a request from a second DBMS to the global lock manager for an L lock to update a record in the data unit;

granting the L lock on the record to the second DBMS;

issuing P lock request to update the data unit by the second DBMS;

providing a request from the global lock manager to the first DBMS to transfer the data unit to the second DBMS in response to the request from the second DBMS for the P lock on the data unit;

transferring the updated version of the data unit from the first DBMS to the second DBMS and providing the version number of the updated version of the data unit to the global lock manager from the first DBMS;

writing the updated version of the data unit to a disk from the first DBMS in response to the request for the P lock from the second DBMS and releasing the P lock held by the first DBMS;

providing the version number from the global lock manager to the second DBMS;

if the version number provided to the second DBMS is greater than the version number in the updated version of the data unit received by the second DBMS from the first DBMS, or if the updated version of the data unit has not been received at the second DBMS, providing the updated version of the data unit to the second DBMS from the disk and updating the record; otherwise, updating the record in the updated version of the data unit transferred to the second DBMS from the first DBMS.

5. The method of claim 4, wherein the system further includes a plurality of transaction logs, each transaction log coupled to a respective DBMS for storage of log data, any version number including a log sequence number (LSN) corresponding to an entry in a transaction log coupled to a DBMS recording updating of a data unit.

6. The method of claim 5, further including the steps of:

maintaining recovery version numbers in each entry in the global lock table, each recovery version number including a LSN representing a first update to a data unit following providing the data unit from a disk to a DBMS;

detecting failure of an owning DBMS holding a P lock to update a data unit before the data unit is written to disk; and at a recovering DBMS, recovering the data unit by obtaining the recovery version number for the data unit from the global lock table, obtaining from all transaction logs updating log entries for the data unit having LSN's equal to or greater than the recovery version number of the data unit, and applying the updating log entries to the data unit in version number sequence.

7. In a system for sharing access to data among a plurality of database management systems (DBMS's) by issuing locks to processes executing in the DBMS's, the data being held in units of transfer ("data units") in DBMS buffers or being copied to the DBMS buffers from one or more disks to which all of the DBMS's are coupled, the locks being issued and managed by a global lock manager to which each of the DBMS's is coupled by a respective communications link, the locks including P locks on data units and L locks on records in the data units, the system including means for coupling each DBMS to all other DBMS's for transferring data, a method for providing fast access to data units, the method comprising the steps of:

maintaining a global lock table at the global lock manager, the global lock table including one or more entries, each entry corresponding to a lock granted to a DBMS;

issuing a P lock for updating a data unit to a first DBMS;

entering an entry for the P lock in the global lock table;

providing a first version of the data unit from a disk to a buffer of the first DBMS;

generating an updated version of the data unit in the buffer by updating the first version of the data unit at the first DBMS;

in response to updating the first version of the data unit:

generating a version number for the updated version of the data unit at the first DBMS, the version number being a monotonically increasing number;

attaching the version number to the updated version of the data unit in the buffer of the first DBMS; and storing the version number in the entry for the P lock in the global lock table;

issuing a request from a second DBMS to the global lock manager for an L lock to update a record in the data unit;

granting the L lock on the record to the second DBMS;

issuing a P lock request to update the data unit by the second DBMS;

providing a request from the global lock manager to the first DBMS to transfer the data unit to the second DBMS in response to the request from the second DBMS for the P lock on the data unit;

transferring the updated version of the data unit from the first DBMS to the second DBMS without writing the updated version of the data unit to disk and providing the version number of the updated version of the data unit to the global lock manager from the first DBMS;

releasing the P lock held by the first DBMS;
providing the version number from the global lock manager to the second DBMS;
if the version number provided to the second DBMS is greater than the version number in the updated version of the data unit received by the second DBMS from the first DBMS, or if the updated version of the data unit is not received by the second DBMS, providing a disk version of the data unit to the second DBMS from the disk, recovering the disk version of the data unit to the updated version of the data unit at the second DBMS and updating the record; otherwise,
updating the record in the updated version of the data unit transferred to the second DBMS from the first DBMS.

8. The method of claim 8, wherein the system further includes a plurality of transaction logs, each transaction log coupled to a respective DBMS for storage of log data, any version number including a log sequence number (LSN) corresponding to an entry in a transaction log coupled to a DBMS recording updating of a data unit.

9. The method of claim 8, further including the steps of:
maintaining a recovery version number in each entry for a plurality of data units in the global lock table, each recovery version number including a LSN representing a first update to a data unit following providing the data unit from a disk to a DBMS;
detecting a failure of an owning DBMS holding update locks on one or more data units before the data units are written to disk; and
at a recovering DBMS, recovering each data unit of the one or more data units by obtaining the recovery version number for the data unit from the global lock table, obtaining from all transaction logs updating log entries for the data unit having LSN's equal to or greater than the recovery version number of the data unit, and applying the updating log entries to the data unit in version number sequence.

10. The method of claim 9, wherein the step of transferring the updated data unit is further without ensuring the writing log records of the step of generating an updated data unit, the method further including the steps of:
maintaining the recovery version number in each entry in the global lock table, each recovery version number including a LSN representing a first update to a data unit following providing the data unit from a disk to a DBMS;
the step of recovering the data unit including forcing any unlogged log entries held by an DBMS into the transaction log for the DBMS, obtaining the recovery version number for the data unit from the global lock table, obtaining from all transaction logs updating log entries for the data unit having LSN's equal to or greater than the recovery version number of the data unit, and applying the updating log entries to the data unit in version number sequence.

11. The method of claim 10, further including the steps of:
detecting a failure of an owning DBMS holding update locks on one or more data units before the data units are written to disk; and
at a recovering DBMS, recovering each data unit of one or more data units by forcing any unlogged log entries held by any operating DBMS for updates to the data unit into the transaction log for the operating DBMS, obtaining the recovery version number of the data unit from the global lock table, obtaining from all logs updating log entries for the data unit having LSN's equal to or greater than the recovery version number of the data unit, and applying the updating log entries to the data unit in version number sequence.

12. The method of claims 9 and 11, further including:
maintaining a global lock table log;
periodically logging the contents of the global lock table into the global lock table log;
detecting a failure in the system;
recovering from the system failure by:
establishing a lowest recovery version number from all version numbers in the global lock table at the time of the system failure;
creating a merged log by merging the contents of all transaction logs from the lowest recovery version number at the end of each log in time-ordered sequence; and
recovering each data unit represented in the merged log by obtaining the data unit from the disk and applying the log records for that data unit from the merged log.

* * * * *